US009639965B2

(12) United States Patent
Weiss

(10) Patent No.: US 9,639,965 B2
(45) Date of Patent: *May 2, 2017

(54) ADJUSTING COLOR ATTRIBUTE OF AN IMAGE IN A NON-UNIFORM WAY

(71) Applicant: Apple Inc., Cupertino, CA (US)

(72) Inventor: Ben Weiss, Carpinteria, CA (US)

(73) Assignee: Apple Inc., Cupertino, CA (US)

( * ) Notice: Subject to any disclaimer, the term of this patent is extended or adjusted under 35 U.S.C. 154(b) by 231 days.

This patent is subject to a terminal disclaimer.

(21) Appl. No.: 14/165,527

(22) Filed: Jan. 27, 2014

(65) Prior Publication Data

US 2014/0139547 A1 May 22, 2014

Related U.S. Application Data

(63) Continuation of application No. 12/029,438, filed on Feb. 11, 2008, now Pat. No. 8,638,338.

(51) Int. Cl.
*G06T 11/00* (2006.01)
*G09G 5/02* (2006.01)
*G06F 3/00* (2006.01)
*H04N 1/62* (2006.01)

(52) U.S. Cl.
CPC .......... *G06T 11/001* (2013.01); *H04N 1/628* (2013.01)

(58) Field of Classification Search
None
See application file for complete search history.

(56) References Cited

U.S. PATENT DOCUMENTS

| 5,774,112 A | 6/1998 | Kasson |
| 6,351,557 B1 | 2/2002 | Gonsalves |
| 6,438,264 B1 | 8/2002 | Gallagher et al. |
| 6,765,608 B1 | 7/2004 | Himeda et al. |
| 6,944,335 B2 | 9/2005 | Pettigrew et al. |
| 7,092,122 B2 | 8/2006 | Iwaki |

(Continued)

FOREIGN PATENT DOCUMENTS

| EP | 0989739 | 3/2000 |
| EP | 1087614 | 3/2001 |

(Continued)

OTHER PUBLICATIONS

Commonly owned PCT Patent Application PCT/US2009/030784, filed Jan. 12, 2009, Apple Inc., which claims priority to U.S. Appl. No. 12/029,438.

(Continued)

*Primary Examiner* — Tize Ma
(74) *Attorney, Agent, or Firm* — Robert C. Kowert; Meyertons, Hood, Kivlin, Kowert & Goetzel, P.C.

(57) ABSTRACT

Some embodiments of the invention provide an image-editing process that non-uniformly adjusts at least one particular color attribute (e.g., saturation level) of pixels in an image. Specifically, the image-editing process of these embodiments uniformly adjusts the particular color attribute of pixels with a first set of values and non-uniformly adjusts the color attribute of pixels with a second set of values. In this manner, some embodiments provide a vibrancy process that non-uniformly adjusts saturation levels of an image in order to preserve saturation levels for skin tones appearing within the image.

17 Claims, 17 Drawing Sheets

(56) References Cited

U.S. PATENT DOCUMENTS

| | | |
|---|---|---|
| 7,292,370 B2 | 11/2007 | Iwaki |
| 7,602,991 B2 | 10/2009 | Kokemohr |
| 7,702,149 B2 | 4/2010 | Ohkubo et al. |
| 7,821,675 B2 | 10/2010 | Coyle et al. |
| 7,853,094 B2 | 12/2010 | Pan et al. |
| 7,978,938 B1 | 7/2011 | Wilensky |
| 8,023,164 B2 | 9/2011 | Ogawa |
| 8,055,067 B2 | 11/2011 | Petrescu et al. |
| 8,098,259 B2 | 1/2012 | Kondo et al. |
| 8,155,465 B2 | 4/2012 | Cho et al. |
| 8,638,338 B2 | 1/2014 | Weiss |
| 2001/0028738 A1 | 10/2001 | Pettigrew et al. |
| 2003/0025835 A1 | 2/2003 | Segman |
| 2003/0202194 A1* | 10/2003 | Torigoe .............. H04N 1/628 358/1.9 |
| 2006/0028483 A1 | 2/2006 | Kondo et al. |
| 2006/0203004 A1 | 9/2006 | Hwang et al. |
| 2006/0204034 A1 | 9/2006 | Steinberg et al. |
| 2007/0065006 A1 | 3/2007 | Wilensky |
| 2007/0171443 A1 | 7/2007 | Pan |
| 2007/0189627 A1 | 8/2007 | Cohen et al. |
| 2007/0195343 A1 | 8/2007 | Yoneda |
| 2008/0034289 A1 | 2/2008 | Doepke et al. |
| 2008/0117333 A1 | 5/2008 | Walsh |
| 2008/0131010 A1 | 6/2008 | Wilensky |
| 2010/0026831 A1 | 2/2010 | Ciuc et al. |
| 2010/0054549 A1 | 3/2010 | Steinberg et al. |

FOREIGN PATENT DOCUMENTS

| | | |
|---|---|---|
| EP | 1326425 | 7/2003 |
| WO | 2009/102514 | 8/2009 |

OTHER PUBLICATIONS

International Preliminary Report on Patentability for PCT Patent Application PCT/US2009/030784, dated Aug. 26, 2010.
International Search Report and Written Opinion of PCT Patent Application PCT/US2009/030784, dated Jan. 16, 2009.
Author Unkown, "Adobe Photoshop 5.0 Limited Edition, Chapter 4: Making Color and Tonal Adjustments," Adobe Photoshop 5.0 User Guide, Jan. 1, 1998, pp. 1-11.

* cited by examiner

ADJUSTING COLOR ATTRIBUTE OF AN IMAGE IN A NON-UNIFORM WAY

This application is a continuation of U.S. patent application Ser. No. 12/029,438, filed Feb. 11, 2008, now U.S. Pat. No. 8,638,338, which is herein incorporated by reference in its entirety.

FIELD OF THE INVENTION

The invention is directed towards image editing. Specifically, the invention is directed towards adjusting at least one color attribute of an image non-uniformly.

BACKGROUND OF THE INVENTION

Image-editing applications provide various image editing functions to modify, enhance, correct, combine, etc. digital images. These functions are implemented as directly applied brushes, filters, or scripts within the image-editing application. Each such function involves a learning curve for one to understand the results produced by the function and also the effects produced by incremental adjustments to the various parameters of the function. Often a combination of the different parameters and the different functions are needed to produce a desired effect. In many instances, this level of image editing understanding exceeds the common knowledge of ordinary users. For instance, a pixel within a given image can be adjusted in any number of different ways. Red, green, and blue (RGB) channels associated with the pixel provide one means to adjust properties of the pixel, while other attributes such as brightness, hue, saturation, etc. provide several other means to alter the properties of the pixel.

More sophisticated image editing functions attempt to simplify many of the basic adjustments. These and other functions can typically apply effects to individual pixels, apply effects uniformly across an entire image, apply effects uniformly across particular regions of an image, or use various filters/gradients to diffuse the effects across regions of the image or the entire image. However, the effects produced by many of the basic and sophisticated functions often do not produce meaningful results that directly address needs of users. One such function is saturation.

Saturation relates to how the human eye perceives color. Specifically, it relates to a color's purity. A pure color is defined as any combination of two primary colors (i.e., red, green, and blue). A color will lose purity or become desaturated when it is diluted with gray. In the RGB color model, gray contains equal amounts of red, green, and blue. For instance, when the RGB color model spans a range of [0 . . . 255] with 255 representing a maximum intensity of either red, green, or blue, a light gray has RGB values (192, 192, 192) and a dark gray has RGB values (128, 128, 128). Therefore, a light orange color having RGB values (255, 128, 0) will have a 50% reduction in saturation when diluted with a gray having RGB values (128, 128, 128). The resulting desaturated color will have RGB values (192, 128, 64) as illustrated in equation (1) below:

$$(255+128)/2=192$$

$$(128+128)/2=128$$

$$(0+128)/2=64 \quad (1)$$

Thus, the more diluted a color becomes, the less saturated the color. An image with higher saturation levels when compared to the same image with lower saturation levels appears more vibrant, whereas the image with less saturation appears washed out or faded.

Prior image-editing applications uniformly increase saturation across an entire image or portions of an image. This static linear increase of saturation levels produces undesirable effects when editing images containing skin tones. Increasing or decreasing the saturation levels for skin tones produces an unnatural appearance. For instance, increasing the saturation levels for skin tones often creates a sun-burnt look while decreasing the saturation levels produces a grayish and equally unnatural looking skin tone. As a result, an incremental increase in the saturation levels causes regions containing skin tones and other easily saturated colors to become over saturated while other regions containing other colors appear remain under saturated.

While it is desirable to increase the saturation of a photograph to bring out the various colors within it, increasing the saturation of skin tones produces an unnatural appearance often creating a sun-burnt look. The saturation functionality and other similar functionality of many existing image-editing applications thus do not provide meaningful effects when applied to photographs.

Therefore, there is a need to provide a simple and efficient image editing function that also produces a meaningful saturation adjustment within an image containing skin tones. There is a need for the function to produce an effect that is applied uniformly (i.e., linearly) to particular regions of the image, while applied non-uniformly (i.e., non-linearly) to other regions in order to produce the meaningful saturation adjustment. Thus, for a digital image containing skin tones, there is a need to differentiate and saturate the non-skin tone regions according to a first set of criteria, while differentiating and saturating the skin-tone regions according to a second set of criteria. Such a function should unevenly distribute the effects of the saturation function in a manner that affects regions more closely related to skin tones less than regions that are less closely related to skin tones.

SUMMARY OF THE INVENTION

Some embodiments of the invention provide an image-editing process that non-uniformly adjusts at least one particular color attribute (e.g., saturation level) of pixels in an image. Specifically, the image-editing process of these embodiments uniformly adjusts the particular color attribute of pixels with a first set of values that fall outside a sub-region of a color space and non-uniformly adjusts the color attribute of pixels with a second set of values that fall within the sub-region of the color space. In this manner, the process adjusts the particular color attribute of a first set of pixels while preserving the particular color attribute of a second set of pixels in an image.

In some embodiments, the image-editing process automatedly identifies and differentiates pixels of an image with the first set of values that fall within a sub-region of a color space from pixels with a second set of values that fall outside the sub-region without requiring users to manually input values for the sub-region of the color space. In some such embodiments, the process then performs a first adjustment to the pixels with the first set of values that is less than a second adjustment to the pixels with the second set of values.

Some embodiments provide a user-modifiable parameter that specifies an amount of adjustment to the particular attribute. The process adjusts the particular attribute of pixels with the first set of values according to the amount specified by the parameter. For pixels that have the second set of values, the process either does not adjust the particular attribute of the pixels or adjusts this attribute by an amount that is less than the amount by which the process adjusts the attribute for the pixels with the first set of values.

In some embodiments, the process examines and compares values of each pixel in an image against a set of predefined values contained within one or more sub-regions of a color space. Each sub-region includes a non-overlapping range of values of the color space with one or more central values. The one or more central values indicate an exact or near exact match and other values within the sub-region that deviate from the central values indicate a lesser exact match depending on an amount of deviation from one or more of the central values. Therefore, those pixels with attribute values outside the one or more sub-regions will be adjusted uniformly and those pixels with attribute values within the one or more sub-regions will be adjusted non-uniformly. The non-uniform adjustment is determined based on a likeness or closeness of a pixel's attribute values to at least one of the central values within the set of predefined values. The closer a pixel's attribute values, the less the process adjusts the pixel's attribute.

In this manner, some embodiments provide a vibrancy process that non-uniformly adjusts saturation levels of an image in order to preserve saturation levels for skin tones appearing within the image. Specifically, the vibrancy operation examines each pixel of an image to compare the pixel's "skin tone" quality against a predetermined region of color attribute values of a color space that define what combination of values are considered skin tones. In some embodiments, the predetermined region encompasses a gamut of different color combinations across different reddish and yellowish hues with different saturation levels to constitute different definitions of a skin tone. Some such embodiments define lesser skin tones (i.e., less exact matches) as other color combinations that deviate from the one or more skin tone color combination definitions. Additionally, some embodiments define the skin tones irrespective of a brightness value associated with a pixel's attributes.

As such, some embodiments provide a broad range of skin tones without requiring user action to define parameters for the skin tones. Those pixels not resembling skin tones will be saturated or desaturated according to the user specified parameter. Those pixels resembling skin tones will be saturated or desaturated according to the pixels' likeness to the skin tones. The more the pixel resembles a skin tone the less the adjustment to the saturation level of the pixel.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

Figure 1:
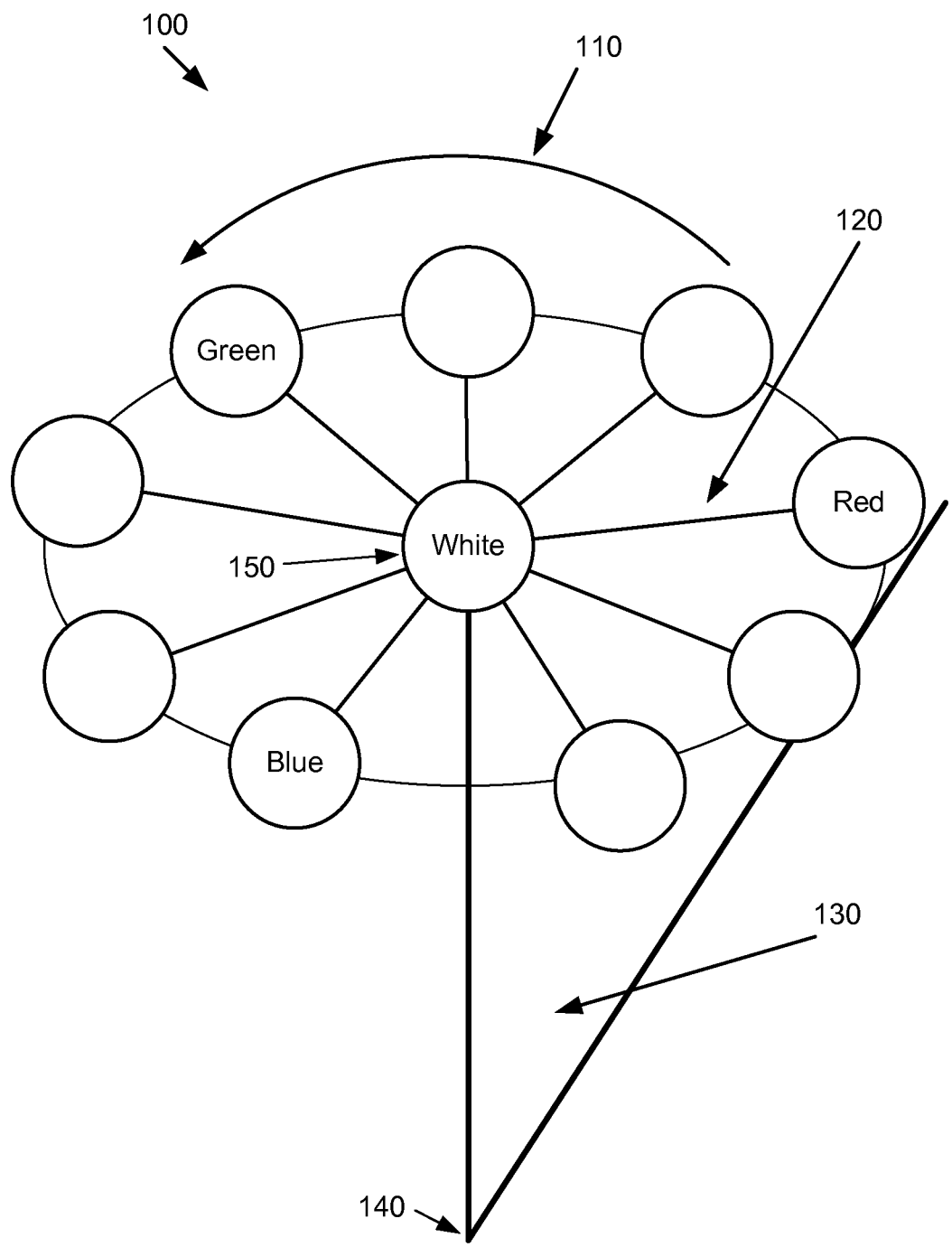
FIG. 1 presents a hue, saturation, value (HSV) color model used in conjunction with some embodiments to define skin tones and saturation levels.

In the following description, numerous details are set forth for purpose of explanation. However, one of ordinary skill in the art will realize that the invention may be practiced without the use of these specific details. For instance, the same techniques described below are applicable to various other image editing functions besides image saturation (i.e., hue, contrast, etc.).

I. Overview

Some embodiments of the invention provide an image-editing process that non-uniformly adjusts at least one particular color attribute (e.g., saturation level) of pixels in an image. Specifically, the image-editing process of these embodiments uniformly adjusts the particular color attribute of pixels with a first set of values that fall outside a sub-region of a color space and non-uniformly adjusts the color attribute of pixels with a second set of values that fall within the sub-region of the color space. In this manner, the process adjusts the particular color attribute of a first set of pixels while preserving the particular color attribute of a second set of pixels in an image.

In some embodiments, the image-editing process automatedly identifies and differentiates pixels of an image with the first set of values that fall within a sub-region of a color space from pixels with a second set of values that fall outside the sub-region without requiring users to manually input values for the sub-region of the color space. In some such embodiments, the process then performs a first adjustment to the pixels with the first set of values that is less than a second adjustment to the pixels with the second set of values.

Some embodiments provide a user-modifiable parameter that specifies an amount of adjustment to the particular attribute. The process adjusts the particular attribute of pixels with the first set of values according to the amount specified by the parameter. For pixels that have the second set of values, the process either does not adjust the particular attribute of the pixels or adjusts this attribute by an amount that is less than the amount by which the process adjusts the attribute for the pixels with the first set of values.

In some embodiments, the process examines and compares values of each pixel in an image against a set of predefined values contained within one or more sub-regions of a color space. Each sub-region includes a non-overlapping range of values of the color space with one or more central values. The one or more central values indicate an exact or near exact match and other values within the sub-region that deviate from the central values indicate a lesser exact match depending on an amount of deviation from one or more of the central values. Therefore, those pixels with attribute values outside the one or more sub-regions will be adjusted uniformly and those pixels with attribute values within the one or more sub-regions will be adjusted non-uniformly. The non-uniform adjustment is determined based on a likeness or closeness of a pixel's attribute values to at least one of the central values within the set of predefined values. The closer a pixel's attribute values, the less the process adjusts the pixel's attribute.

In this manner, some embodiments provide a vibrancy process that non-uniformly adjusts saturation levels of an image in order to preserve saturation levels for skin tones appearing within the image. Specifically, the vibrancy operation examines each pixel of an image to compare the pixel's "skin tone" quality against a predetermined region of color attribute values of a color space that define what combination of values are considered skin tones. In some embodiments, the predetermined region encompasses a gamut of different color combinations across different reddish and yellowish hues with different saturation levels to constitute different definitions of a skin tone. Some such embodiments define lesser skin tones (i.e., less exact matches) as other color combinations that deviate from the one or more skin tone color combination definitions. Additionally, some embodiments define the skin tones irrespective of a brightness value associated with a pixel's attributes.

As such, some embodiments provide a broad range of skin tones without requiring user action to define parameters for the skin tones. Those pixels not resembling skin tones will be saturated or desaturated according to the user specified parameter. Those pixels resembling skin tones will be saturated or desaturated according to the pixels' likeness to the skin tones. The more the pixel resembles a skin tone the less the adjustment to the saturation level of the pixel.

Several more detailed embodiments of the invention are described in the sections below. Section II describes the vibrancy operation of some embodiments which are implemented in an image-editing application. Next, Section III describes several more detailed embodiments for the image-editing application of some embodiments. This section also describes the implementation of the vibrancy function within the more detailed descriptions of the image-editing applications of some embodiments. Lastly, Section IV describes a computer system with which some embodiments of the invention are implemented.

II. Vibrancy Function

FIG. 1 presents a hue, saturation, value (HSV) color model 100 used in conjunction with some embodiments to define skin tones and saturation levels. In this figure, the hue for a given pixel of an image changes along the circumference 110 of the color model cylinder, the saturation changes based on a radial distance 120 from a center of the color model, and the value determining the lightness or darkness of the color changes vertically 130 along the color model cylinder.

With reference to the saturation of a color, a color is more saturated the further the color appears from the center of the cylinder. The center represents the gray scale where the lowest point 140 contains no color (i.e., black), the highest point 150 represents the presence of all colors at their maximum intensity (i.e., white), and all other points along a vertical line connecting the highest point to the lowest point represent different shades of gray. Each shade of gray represents an equal presence of all colors, though the darker the gray the lesser the intensity of the colors and the lighter the gray the greater the intensity of the colors. Therefore, saturation also depends on the intensity of the colors. As seen in the color model 100, the less intense a color or the lower the value 130, the less the amount of saturation 120.

In some embodiments, skin tones are broadly defined along a range of the color model. Using the color model of FIG. 1, skin tones are defined between reddish and yellowish hues, a particular saturation range, and a particular intensity represented using the values 130. In this manner, some embodiments broadly define skin tones to cover skin tone ranges associated with different races and/or ethnicities. Such a broad definition removes the need for users manually defining skin tones. It should be apparent to one of ordinary skill in the art that some embodiments provide a threshold parameter to increase or reduce the range of skin tones recognized by some embodiments.

In digital photography, colors captured within a digital image often become over-saturated or under saturated due to a variety of reasons, such as poor (i.e., uneven or spot) lighting, poor image sensors within a digital camera (i.e., charge-coupled devices or CCDs), different optics such as wide-angle lens or macro lens, aperture speed, focus point settings, lossy digital image compression, etc. Applying a standard saturation function to such images restores the vibrancy and/or color sharpness uniformly throughout the image. In so doing, skin tones, as one example, often become unrealistically saturated producing an unnatural appearance.

Skin tones comprise colors to which human vision and perception are particularly sensitive. A relatively small change to a skin toned color can produce a disproportionately large visual effect. For instance, a slight increase to the saturation level of a skin tone where the red, green, blue (RGB) value of the skin tone changes from (0.7, 0.5, 0.3) to (0.8, 0.5, 0.2) produces a stronger perceptual effect than a slight increase to the saturation level of a moderately saturated greenish-blue color where the RGB value changes from (0.3, 0.5, 0.7) to (0.2, 0.5, 0.8), where each of the red, green, and blue channels of the RGB value are within a range of [0.0 . . . 1.0]. This is often due to human vision being finely attuned towards skin tones.

Similarly, humans expect certain objects to be within certain levels of saturation with some objects (e.g., the saturation levels associated with human skin) falling within a smaller saturation range than other objects (e.g., saturation levels associated with leaves of a tree). For example, a digital image that includes an ocean background with people in the foreground would be a difficult image to saturate using standard saturation functions. Specifically, the blues within the ocean background can be saturated to appear more or less blue as a wide range of blues are acceptable in order to retain a natural looking ocean. However, skin tones for the people appearing within the foreground of the image will be less accepting to changes in saturation levels. Even a slight increase in the saturation levels for the skin tones can result in an unnatural looking skin tone (e.g., overly red).

As a result, the prior art method of applying a uniform saturation function across an image produces unrealistic results. Therefore, some embodiments provide a vibrancy function that saturates skin tones and non-skin tones in an image differently. In some embodiments, the vibrancy function is an image editing item with at least one modifiable parameter (e.g., graphical slider bar, numerical text-based dialog box, drop down box, etc.) for increasing or decreasing the saturation of colors within a digital image without over saturating or under saturating the skin tones within the same digital image. By preserving the saturation levels of skin tones, the image can be made more vibrant without producing the unnatural appearing skin tones that otherwise affects standard saturation functions.

Figure 2:
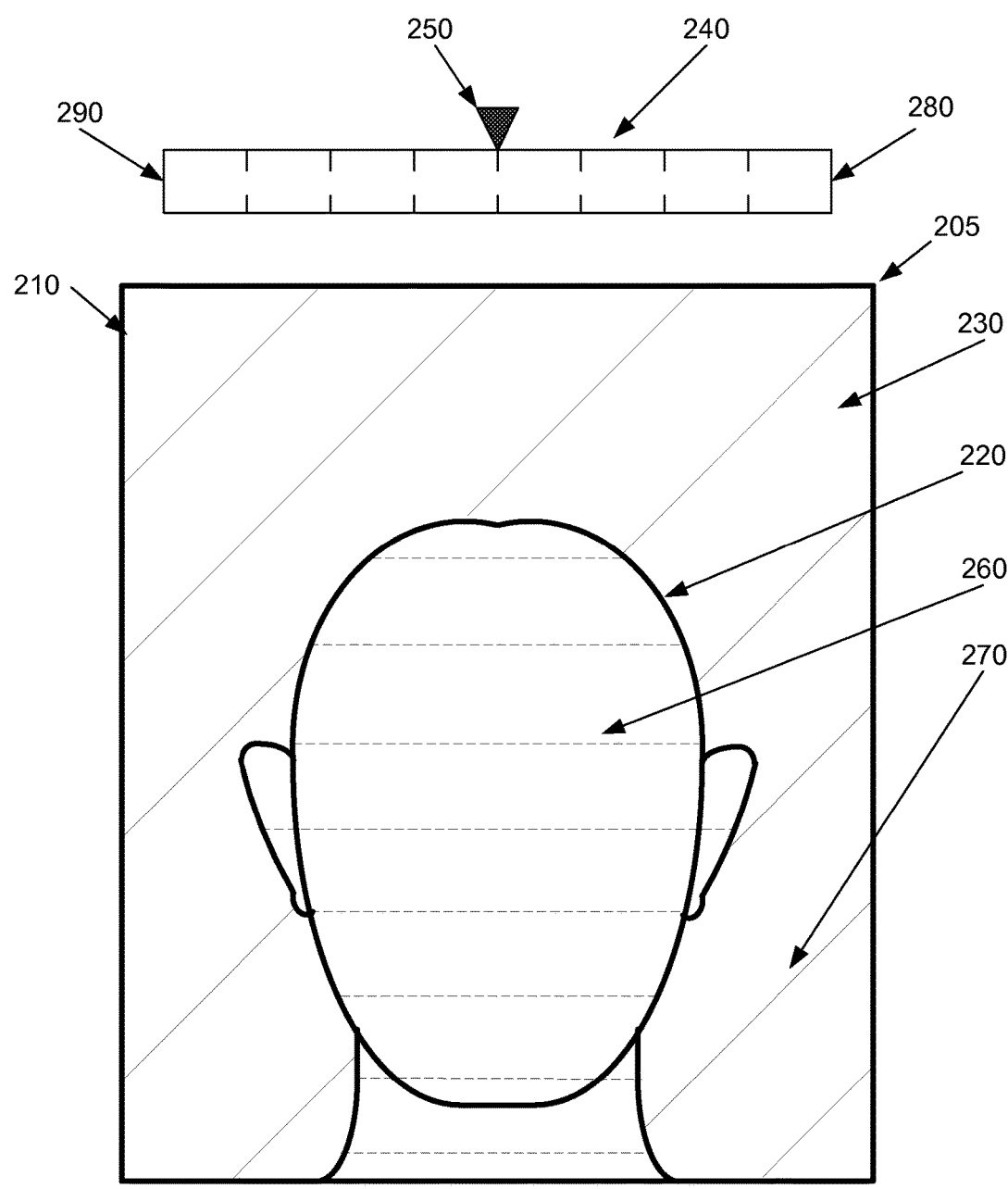
FIG. 2 illustrates saturation levels for an image that includes a head with skin tones and a background without skin tones using a series horizontal lines to represent the saturation intensity for the skin tones of the head and a series of diagonal lines to represent the saturation intensity for the colors appearing within the background.

FIGS. 2-7 illustrate a user interface of an image-editing application that implements the vibrancy function of some embodiments. As shown in FIG. 2, this user interface includes (1) a display window 205 for displaying images and (2) a vibrancy slider bar 240 with a position indicator 250 for modifying the amount of saturation to apply to the image using the vibrancy function.

Figure 3:
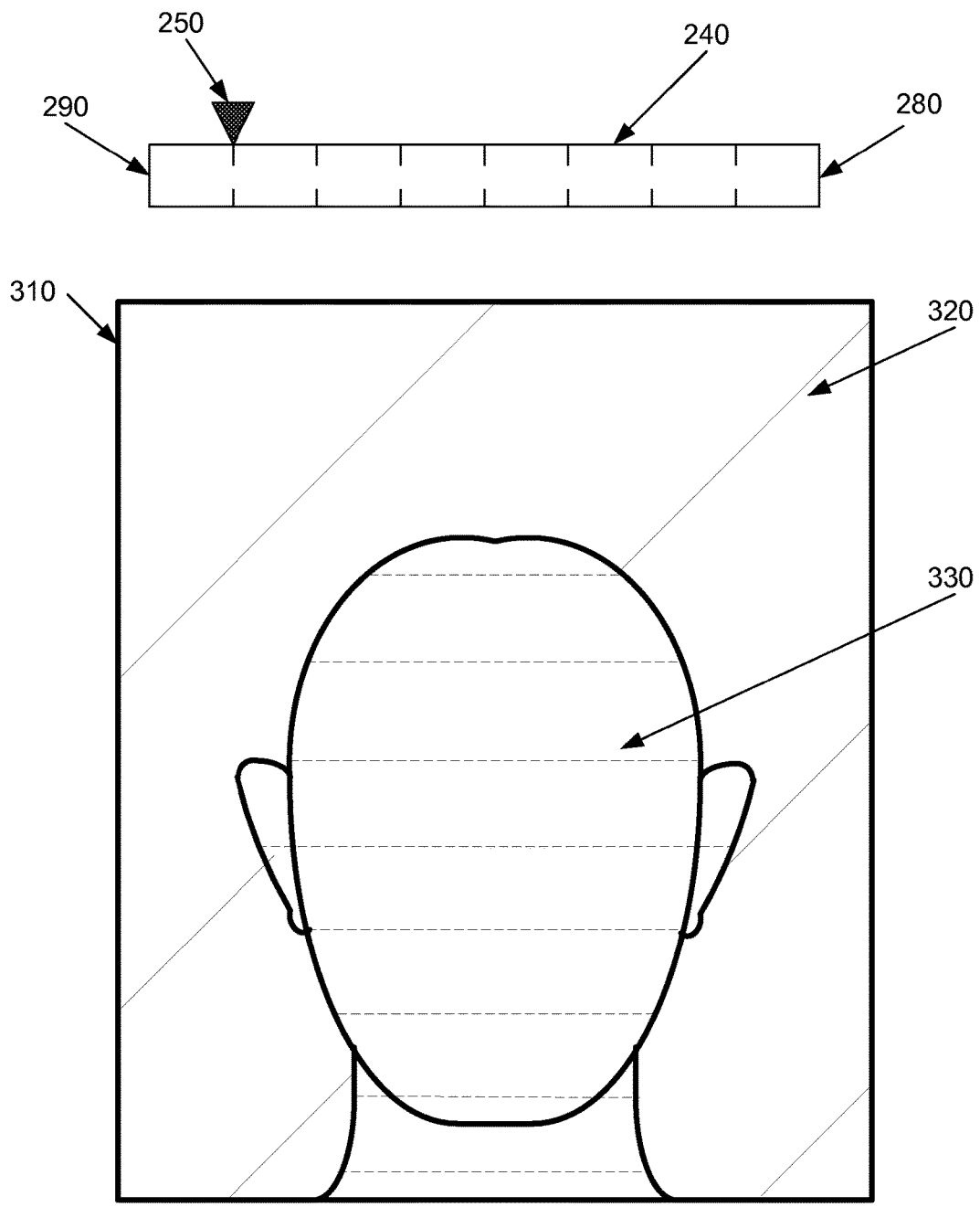
FIG. 3 illustrates the effects to the image after the position indicator is moved towards the second end of the slider bar to decrease the saturation levels.
Figure 4:
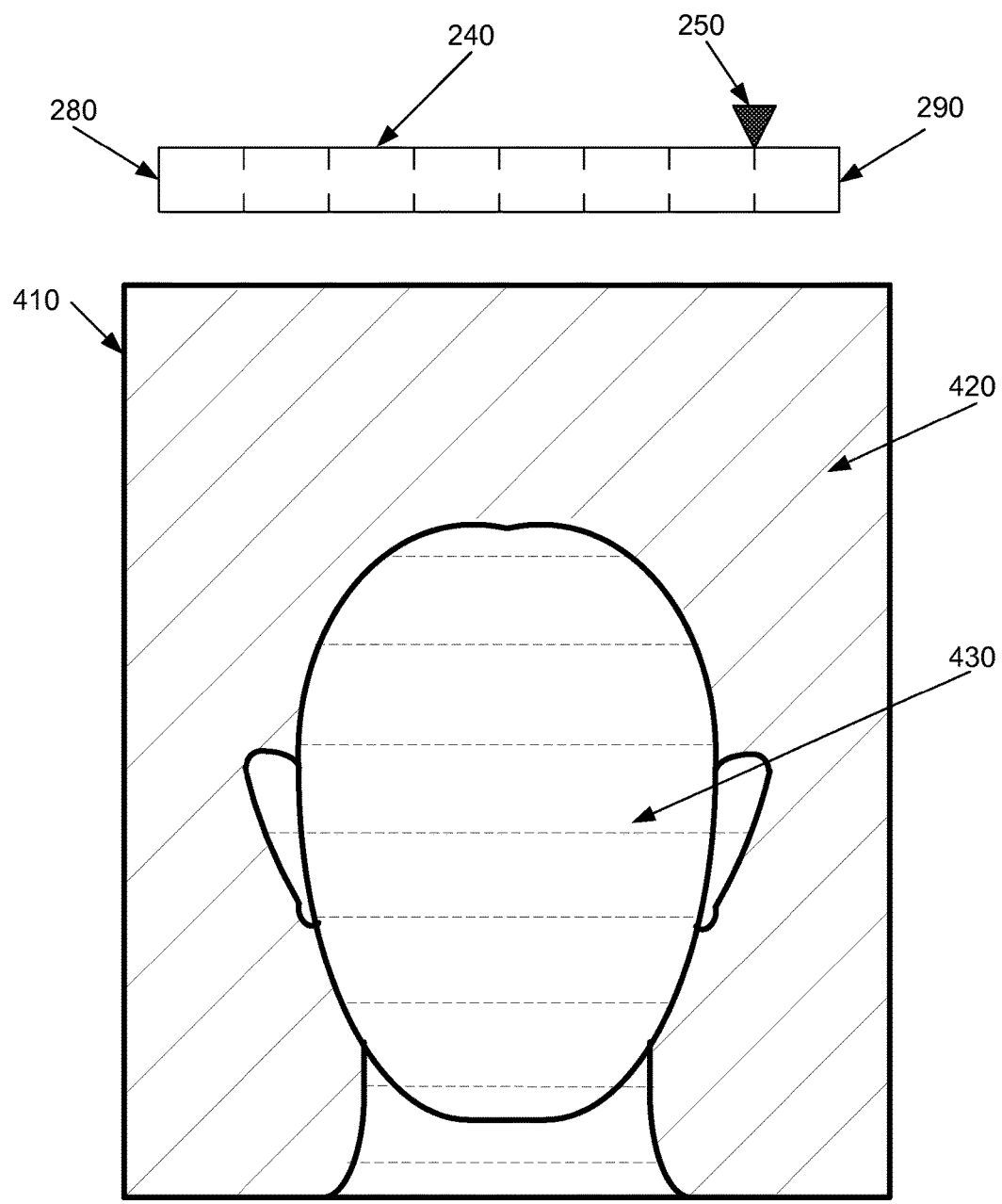
FIG. 4 illustrates the effects to the image after the position indicator is moved towards the first end of the slider bar to increase the saturation levels.
Figure 5:
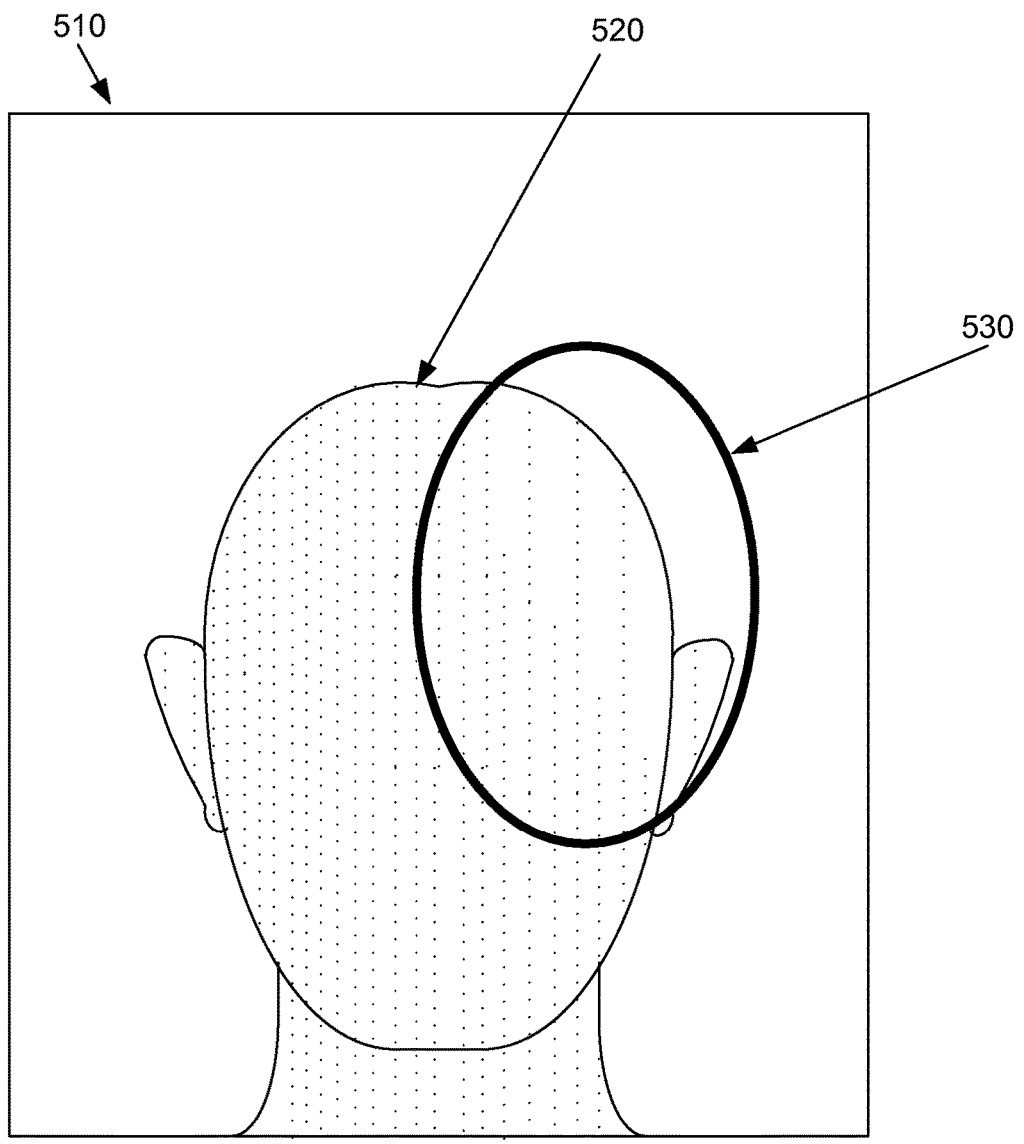
FIG. 5 presents an image containing a non-uniform distribution of skin tones across the head.
Figure 6:
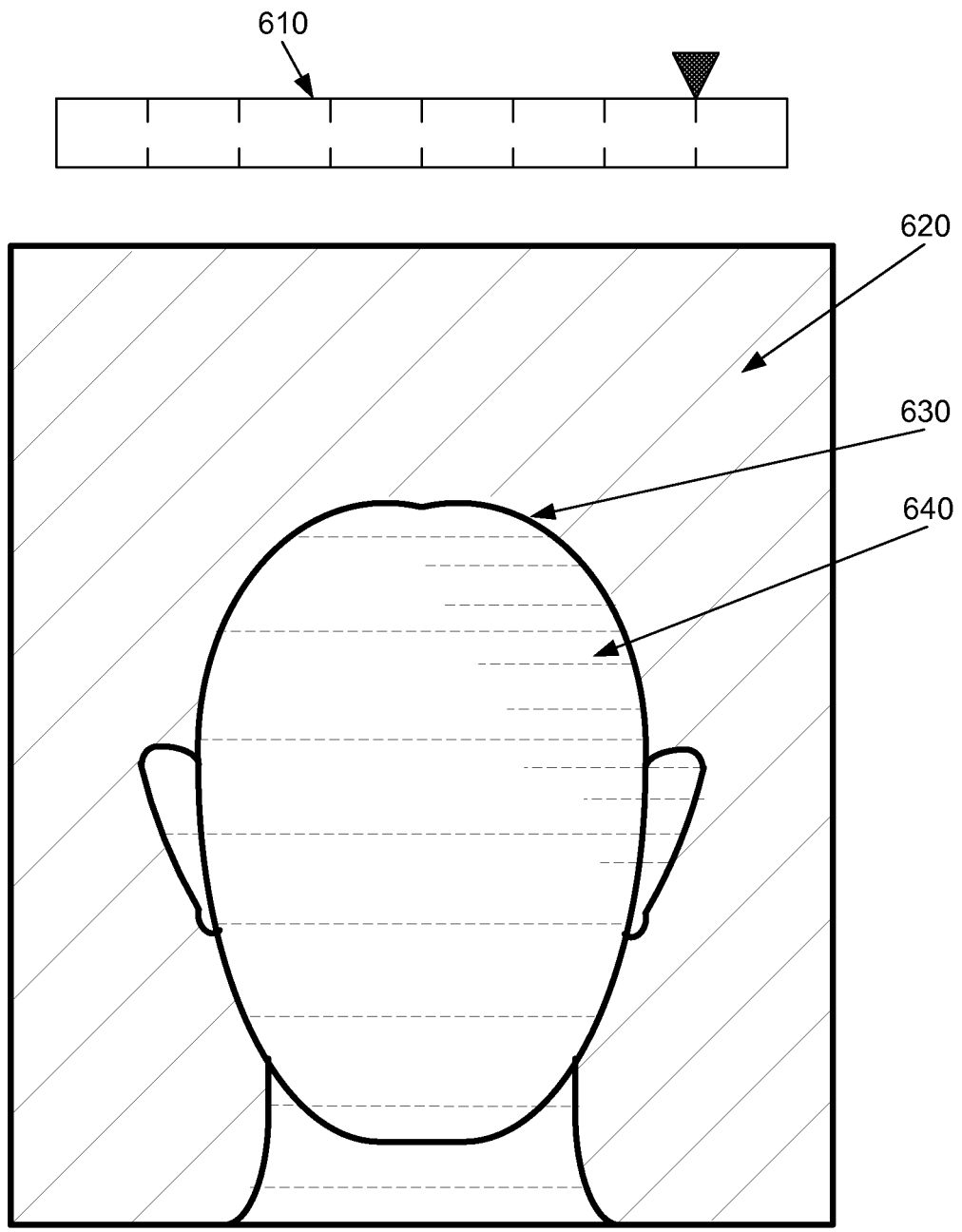
FIG. 6 illustrates the saturation function and its resulting effects when applied to an image with non-uniform skin tones.
Figure 7:
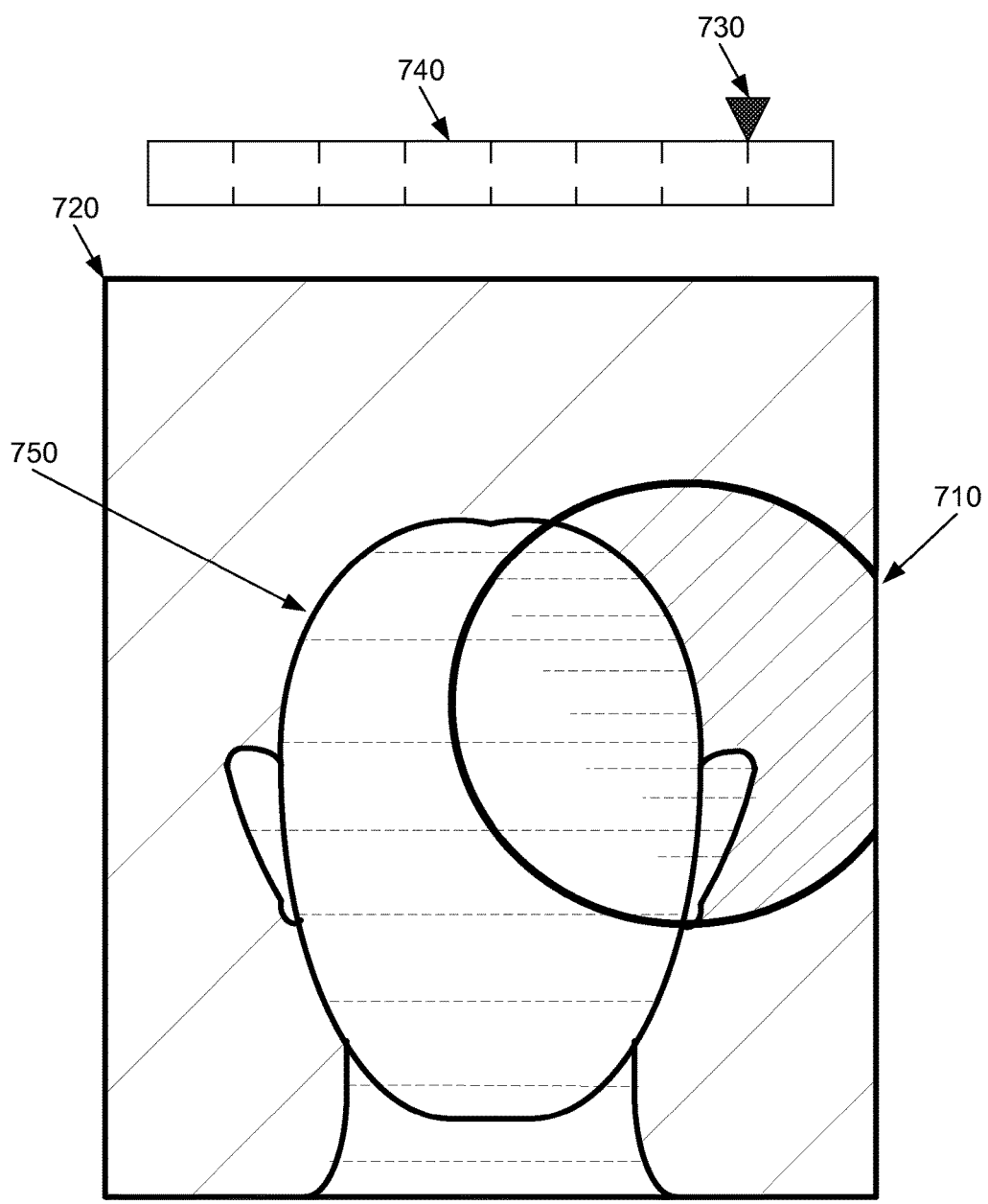
FIG. 7 illustrates the selective application of the vibrancy function to a region of an image.

In the example illustrated in FIGS. 2-7, the display window 205 displays an image 210 that includes a head 220 with skin tones and a background 230 that does not contain skin tones. The saturation levels for both the head 220 and the background 230 are shown in FIG. 2 using a series horizontal lines 260 to represent the saturation intensity for the skin tones of the head 220 and a series of diagonal lines 270 to represent the saturation intensity for the colors appearing within the background 230. In FIG. 2, it is assumed that the skin tones for the head 220 are uniform throughout the head. FIGS. 5 and 7 illustrate the effects of the saturation function when the skin tones are not uniform.

As the position indicator 250 moves across the slider bar 240, the saturation levels of the image are adjusted according to the processes 1400 and 1500 described below. A first end 280 of the slider bar 240 increases the saturation levels of the image 210 while preserving the skin tones, and a second end 290 decreases the saturation levels of the image 210 while preserving the skin tones.

FIG. 3 illustrates the effects to the image 210 after the position indicator 250 is moved towards the second end 290 of the slider bar 240 to decrease the saturation levels of the image 210. The resulting image 310 shows that the saturation intensity of the background 320 colors have been reduced (i.e., fewer diagonal lines) while the saturation intensity for the skin tones within the head 330 is only minimally modified or remains constant (i.e., same number of horizontal lines).

FIG. 4 illustrates the effects to the image 210 after the position indicator 250 is moved towards the first end 280 of the slider bar 240 to increase the saturation levels. The resulting image 410 shows that the saturation intensity of the background 420 colors has increased (i.e., more diagonal lines) while the saturation intensity for the skin tones within the head 430 is minimally modified or remains constant (i.e., same number of horizontal lines).

Thus far, FIGS. 3 and 4 have assumed a uniform skin tone within the head that very closely resembles the defined skin tone attributes of some embodiments. As a result, there is little to no change in the saturation levels for the skin tones when the position indicator 250 is moved along the slider bar 240. However, in many instances, the skin tones appearing within the image are non-uniform (i.e., contain a range of skin tones).

FIG. 5 presents an image 510 containing a non-uniform distribution of skin tones across the head 520. In this figure, a higher concentration of dots represents a closer skin tone match. Therefore, region 530 which contains a lower dot concentration is an area within the head where the colors are only loosely related to skin tones. Various reasons account for the non-uniform region, such as an individual's natural pigmentation, unbalanced lighting when the image was captured, optics used in capturing the image, etc.

FIG. 6 illustrates the saturation function and its resulting effects when applied to the image 510 with a non-uniform distribution of skin tones. In FIG. 6, the slider bar 610 indicates that an increase to the saturation levels of the image is specified. Since the background 620 does not contain skin tones, the saturation levels will be adjusted similar to the background 420 of FIG. 4. However, the skin tones appearing within head 630 contain the non-uniform skin tone distribution of FIG. 5. Areas within the non-uniform region that less resemble skin tones become more saturated as indicated by the additional horizontal lines 640 in the non-uniform region.

Some embodiments allow for the selective application of the vibrancy function to a particular region of the image rather than the entire image. FIG. 7 illustrates the selective application of the vibrancy function to a region 710 of an image 720. In this figure, the user first selects a region of interest 710. Some embodiments permit the selection of the region 710 using a click and drag operation within the display window of the user interface. The user then modifies the vibrancy parameter for the selected region 710 by adjusting the position indicator 730 within the slider bar 740.

As shown, the user has selected to increase the vibrancy within the selected region 710 where the region of the head 750 that falls within the selected 710 contains the non-uniform skin tone distribution of FIG. 5 (i.e., the pixels closer to the left ear less resemble skin tones than the pixels elsewhere within the head). The resulting saturation effect causes an increase to the saturation levels of the non-skin tone colors of the selected region 710, while the saturation levels of the skin-tone colors within the selected region 710 are preserved according to the likeness of the skin tones. The figure illustrates some increase in the saturation levels of skin tones, as in FIG. 6, for those regions where the colors resemble skin tones less than other colors throughout the head 750.

Figure 8A:
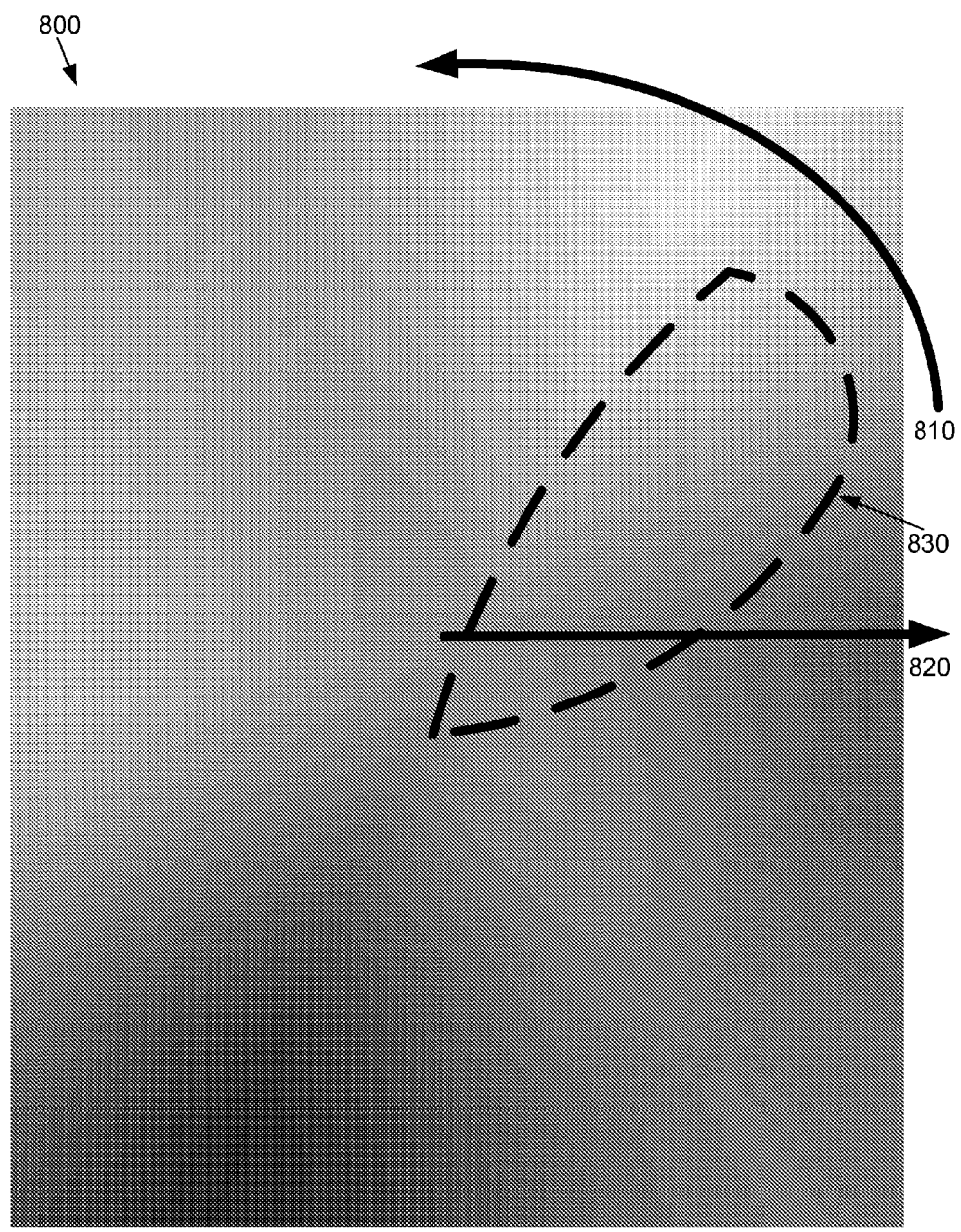
FIG. 8A presents a standard color space that illustrates the various color combinations to which color attribute values of pixels in an image are mapped.

In some embodiments, the vibrancy function is extensible and applicable to a large gamut of skin tones and not a single skin tone. FIG. 8A presents a standard color space 800 that illustrates the various color combinations to which color attribute values of pixels in an image are mapped. In some embodiments, the color combinations of the color space 800 are defined using red, green, blue (RGB) values while in other embodiments the color combinations of the color space 800 are defined using hue and saturation values. Specifically, the angle around 810 the color space 800 represents a hue associated with a color, and the distance 820 from the center of the color space 800 represents an amount of saturation applied to the color. The further away from the center, the more the color is saturated.

An image adjusted by the vibrancy function includes pixels with color attributes. The values for the color attributes of the pixels define different color combination values within the color space 800. Some embodiments define the correlation between the pixel attributes and the color space by mapping image space coordinates such as pixel color attribute values of the image to color space 800 coordinates such as hue and saturation values of the color space. These color attribute values and the corresponding color combinations of the color space 800 are physically represented to a user through a display device or a printing device that reproduces the color combination values from a computer readable medium to some physical medium (e.g., monitor or paper) of the device.

Some embodiments define skin tones of an image to include a sub-region of color combination values represented by the dotted sub-region 830 within the color space 800. Saturation levels for colors within the skin tone sub-region 830 are preserved more than saturation levels for colors outside the skin tone sub-region 830. In this figure, the center of the skin tone sub-region 830 indicates a more exact color combination skin tone match than a color combination further away from the center. It should be apparent to one of ordinary skill in the art that the more exact color combination skin tone match may be located anywhere within the sub-region 830 and need not be centered within the sub-region 830.

Figure 8B:
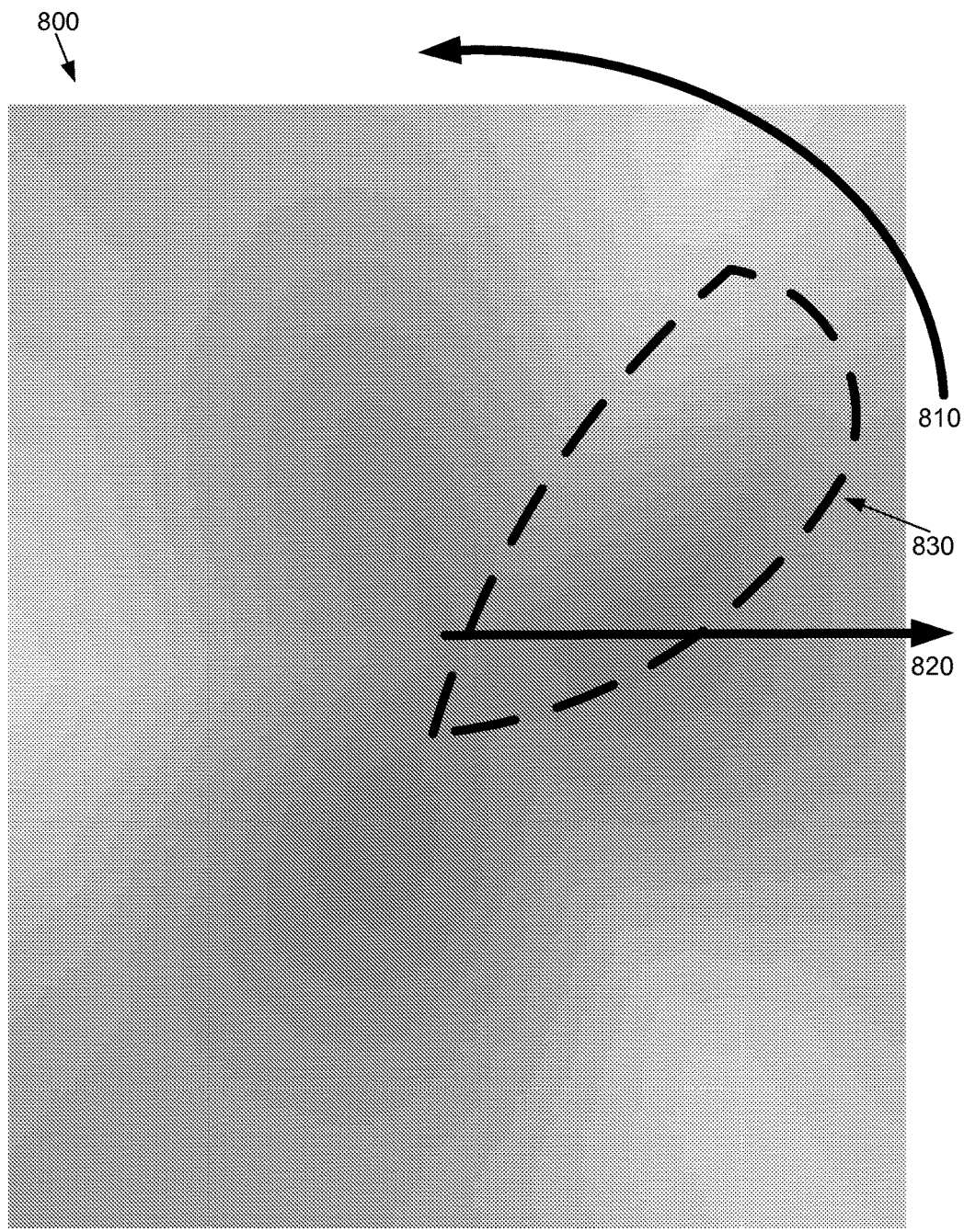
FIG. 8B illustrates an effect of the vibrancy function of some embodiments when the vibrancy of the color wheel is reduced by some large amount (i.e., 70%).

FIG. 8B illustrates an effect of the vibrancy function of some embodiments when the saturation levels of the color space 800 are reduced by some large amount (i.e., 70%). As shown in this figure, the saturation levels for color combinations outside the sub-region 830 are almost completely lost and the resulting colors are more gray. Conversely, the saturation levels for color combinations within the sub-region 830 are much better preserved with saturation levels for color combinations at the center (i.e., more exact skin tone match) being preserved better than saturation levels for color combinations at the outer edges of the sub-region 830.

Figure 9:
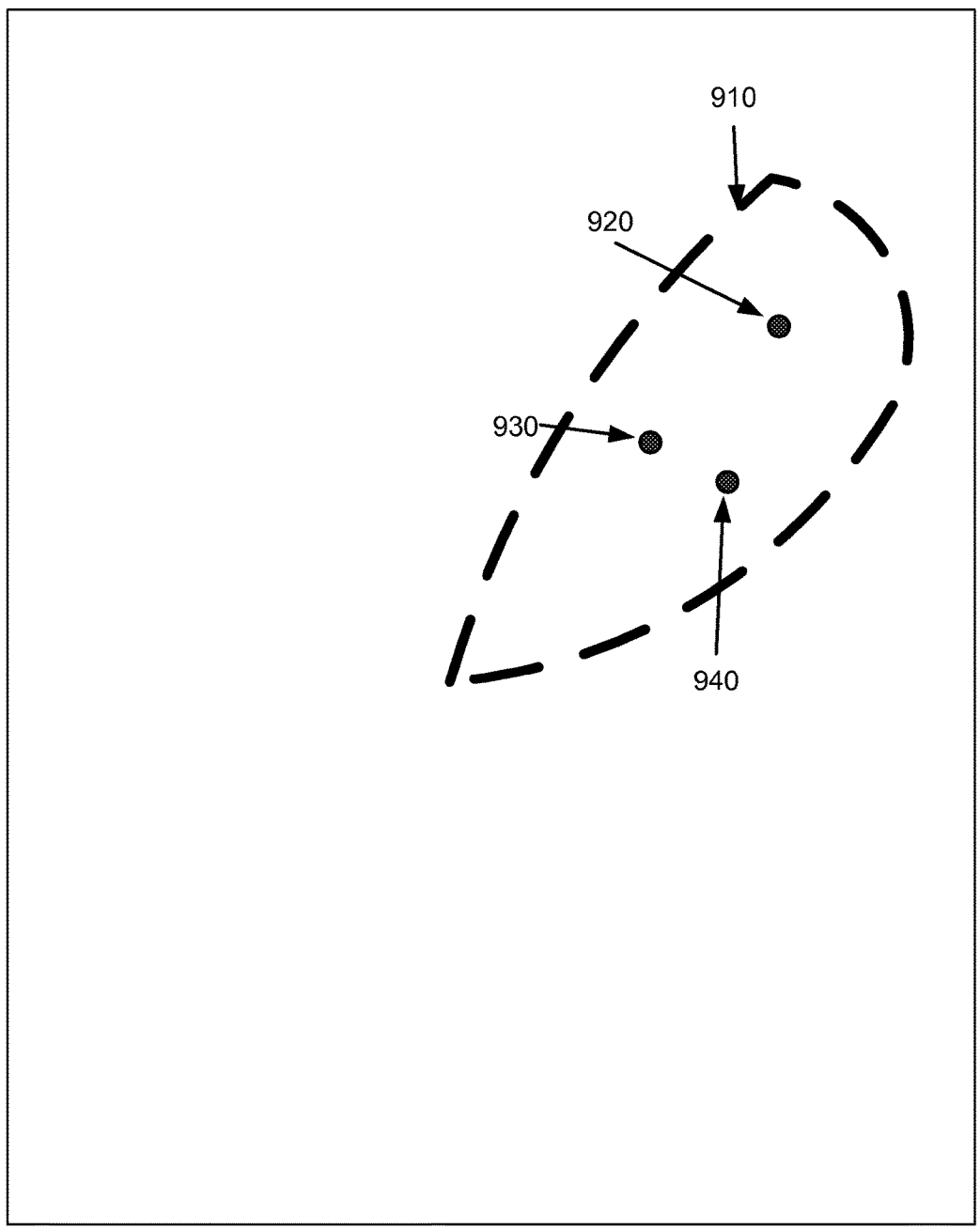
FIG. 9 illustrates a skin tone region of some embodiments that includes several points within the region containing different color combinations where each such color combination defines an exact or near exact skin tone match.

In some embodiments, the skin tone sub-region includes multiple different color combination sub-regions as opposed to the contiguous region 830 illustrated in FIGS. 8A and 8B. For instance, a first skin tone color combination sub-region is defined to be within a reddish-orange hue range with a first saturation range and a second skin tone color combination sub-region is defined to be within a yellowish-orange hue range with a second saturation range. Additionally, as shown in FIG. 9, the defined skin tone sub-region 910 of some embodiments includes several points containing different color combinations 920, 930, and 940 where each such color combination 920, 930, or 940 defines an exact or near exact skin tone match.

Therefore, for a pixel in an image that specifies a color combination not within the sub-region 910, the vibrancy function will uniformly apply the amount of saturation adjustment specified by the vibrancy function. For a pixel in the image with color attribute values matching any one of the 920, 930, or 940 skin tone color combinations, the vibrancy function will maintain or only minimally adjust the saturation level for such a pixel. Lastly, for a pixel with color attribute values specifying any other color combination within the sub-region 910, the vibrancy function will adjust the amount of saturation that is applied to such a pixel less than the amount of saturation applied to a pixel outside the sub-region 910, but greater than a pixel with an exact or near exact skin tone color combination 920, 930, or 940.

The amount of saturation to apply to such a pixel that is within the sub-region 910 but that is not an exact or near skin tone match 920, 920, or 940 is determined based on the distance or deviation of the pixel's color attribute values from the nearest skin tone color combination 920, 930, or 940. The closer a pixel within the sub-region 910 is to a skin tone match 920, 930, or 940, the less the saturation level of the pixel is adjusted. Accordingly, some embodiments of the invention non-uniformly adjust the saturation level for a pixel within the sub-region 910 where the non-uniform adjustment not only accounts for matching criteria (e.g., an exact or near exact skin tone match), but also accounts for the quality of the match (e.g., the amount of deviation from an exact or near exact skin tone match).

Figure 10:
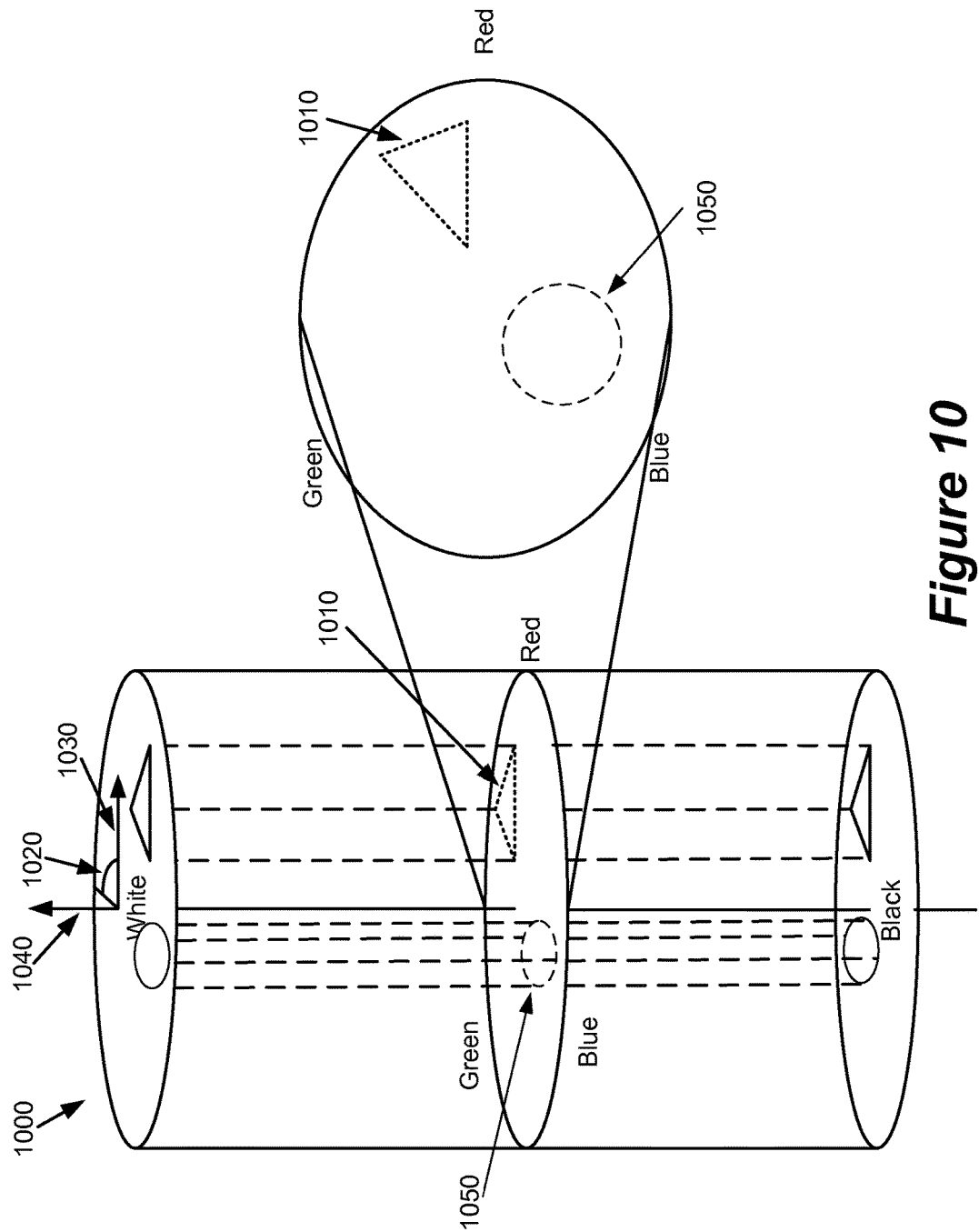
FIG. 10 illustrates defining a skin tone range 1010 using a three dimensional color model in accordance with some embodiments.

In some embodiments, the defined sub-region extends across three-dimensional color spaces and across multiple different color space models (e.g., RGB, HSV, HSL, YCrCb, etc.). FIG. 10 illustrates defining a skin tone range 1010 using a three dimensional color model in accordance with some embodiments. In this figure, the color model 1000 is defined using a three dimensional cylindrical color model. In some embodiments, the different coordinates of the cylindrical color model represent the hue 1020, saturation 1030, and value 1040 (HSV) associated with a color in the color model. FIG. 10 also illustrates that the color combination skin tone region 1010 applies to all luminous levels of the color model 1000 equally. Therefore, a skin tone that falls within a shadow and is less bright than a skin tone that receives ample light will be treated the same as the lit skin tone.

In some embodiments, the vibrancy function can be expanded so as to preserve any particular color within an image and is not limited to the skin tone preservation described in the embodiments above. For instance in FIG. 10, a second sub-region 1050 includes a color combination region of the color model 1000 that is non-contiguous with the first sub-region 1010. In some such embodiments, the saturation levels for color combinations within the second sub-region 1050 are preserved in a similar manner to the saturation levels of the color combinations falling within the first sub-region 1010. As evident in the figure, the shape of the sub-regions 1010 and 1050 may differ and therefore the size of the sub-region and the pixel color attribute values that fall within the different sub-regions differ accordingly.

When adjustments are made to the vibrancy parameter, all color attribute values of pixels in an image that do not fall within either the first sub-region 1010 or the second sub-region 1050 become saturated per the vibrancy parameter and those color attribute values of pixels that fall within the sub-regions 1010 and 1050 will have their saturation levels non-uniformly adjusted as mentioned above.

An example of a non-skin toned sub-region that is to be preserved may include an exact or near exact matching color combination that has a RGB value of (0.1, 0.15, 0.5) where each of the red, green, and blue channels of the RGB value are within a range of [0.0 . . . 1.0]. An associated threshold value specifies the sub-region of other color combinations to be preserved that surround the matching color combination. It should be apparent that in some embodiments the threshold is specified using a non-linear equation thus creating a non-uniform shaped sub-region within a color space. However, a uniform threshold of +/−0.1 RGB will cause any pixels within the image that are +/−0.1 RGB values away from the matching color to be preserved. A first pixel having an RGB value of (0.2, 0.24, 0.58) will be somewhat preserved as the color falls within the threshold. However, the saturation level of the first pixel will be adjusted, though less than pixels with color attribute values not falling within the threshold. A second pixel having an RGB value of (0.12, 0.155, 0.48) will have its saturation levels adjusted even less than the first pixel as it is a closer match to the matching color combination.

Additionally, some embodiments may operate in conjunction with various image recognition algorithms to adjust the vibrancy of different aspects of an image. For instance, some embodiments further refine the identification of skin tones when coupled with facial recognition algorithms. Additionally, various image recognition algorithms when used in conjunction with the vibrancy function can be used to adjust the saturation of an image foreground and not the image background and vice versa.

The vibrancy function of some embodiments can be incorporated into any image-editing application by way of a plug-in, applet, or direct function incorporated within the application itself. Accordingly, different image-editing applications, such as Apple Aperture®, Apple iPhoto®, Adobe Photoshop®, and Adobe Lightroom® may each implement the vibrancy function described herein. Additionally, the vibrancy function of some embodiments can be incorporated within the functionality of an operating system such as Microsoft Windows® or Apple Mac OS®. Specifically, the vibrancy function of some embodiments is a tool that is selectable from any folder that access files within the file system of the operating system.

III. Image-Editing Application

Figure 11:
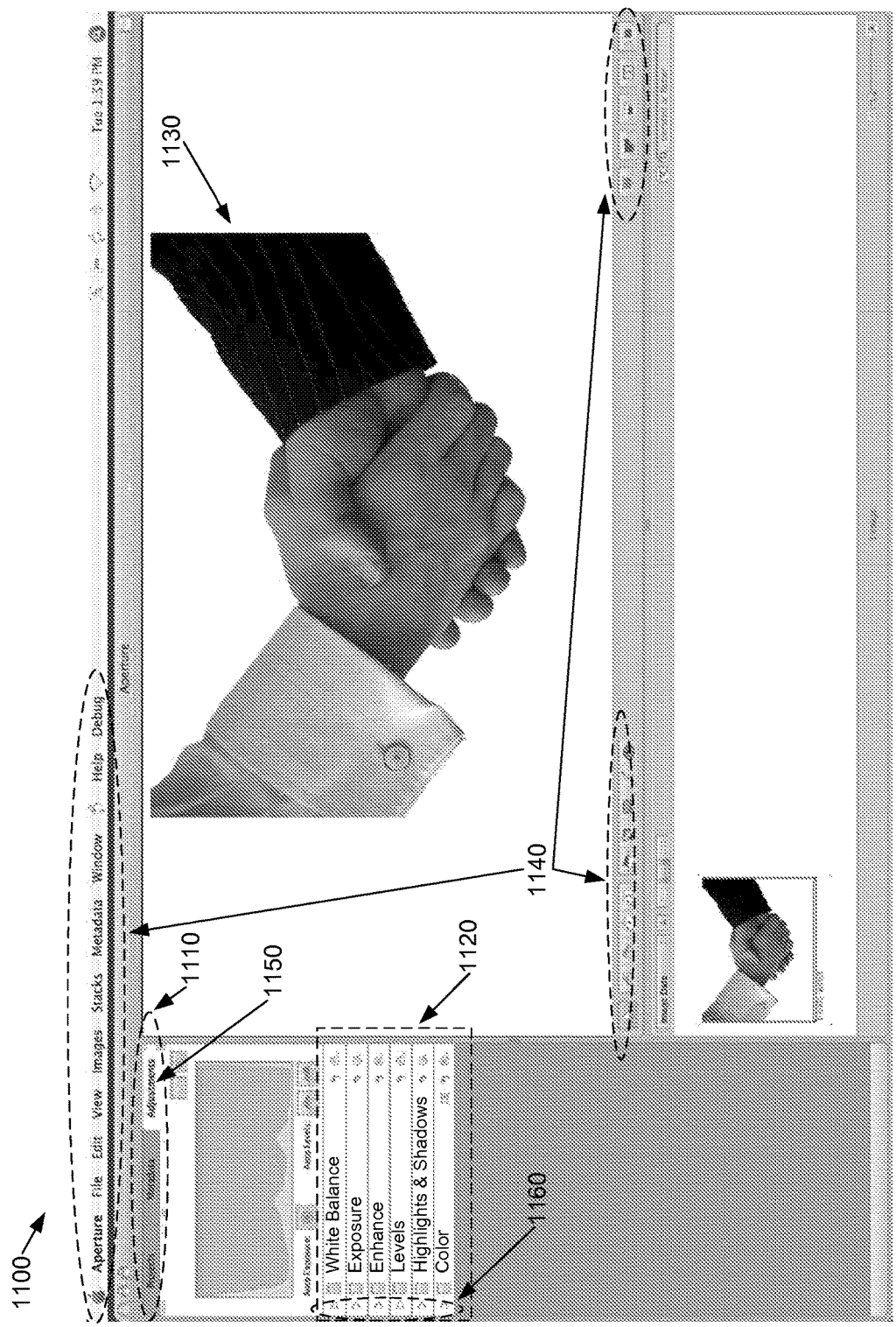
FIG. 11 shows an image-editing application in accordance with some embodiments of the invention.

FIG. 11 shows an image-editing application 1100 in accordance with some embodiments of the invention. The image-editing application 1100 provides (1) a set of selectable tabs 1110 that reveal various functions 1120 for modifying an image, (2) a main display window 1130 to display the image, and (3) a set of various menu controls and selectable icons 1140 to further adjust the image by providing different views of the image or by providing additional functionalities.

The set of selectable tabs 1110 provide a means to access data relating to a project, data relating to an image, or functions to apply to the image. The various image editing functions are incorporated within sets of collapsible function menus 1120. Each of the collapsible function menus 1120 contain groups of related functions and parameters for adjusting the effect produced by a function. Each function is expandable and collapsible through the selectable user interface items 1160.

Figure 12:
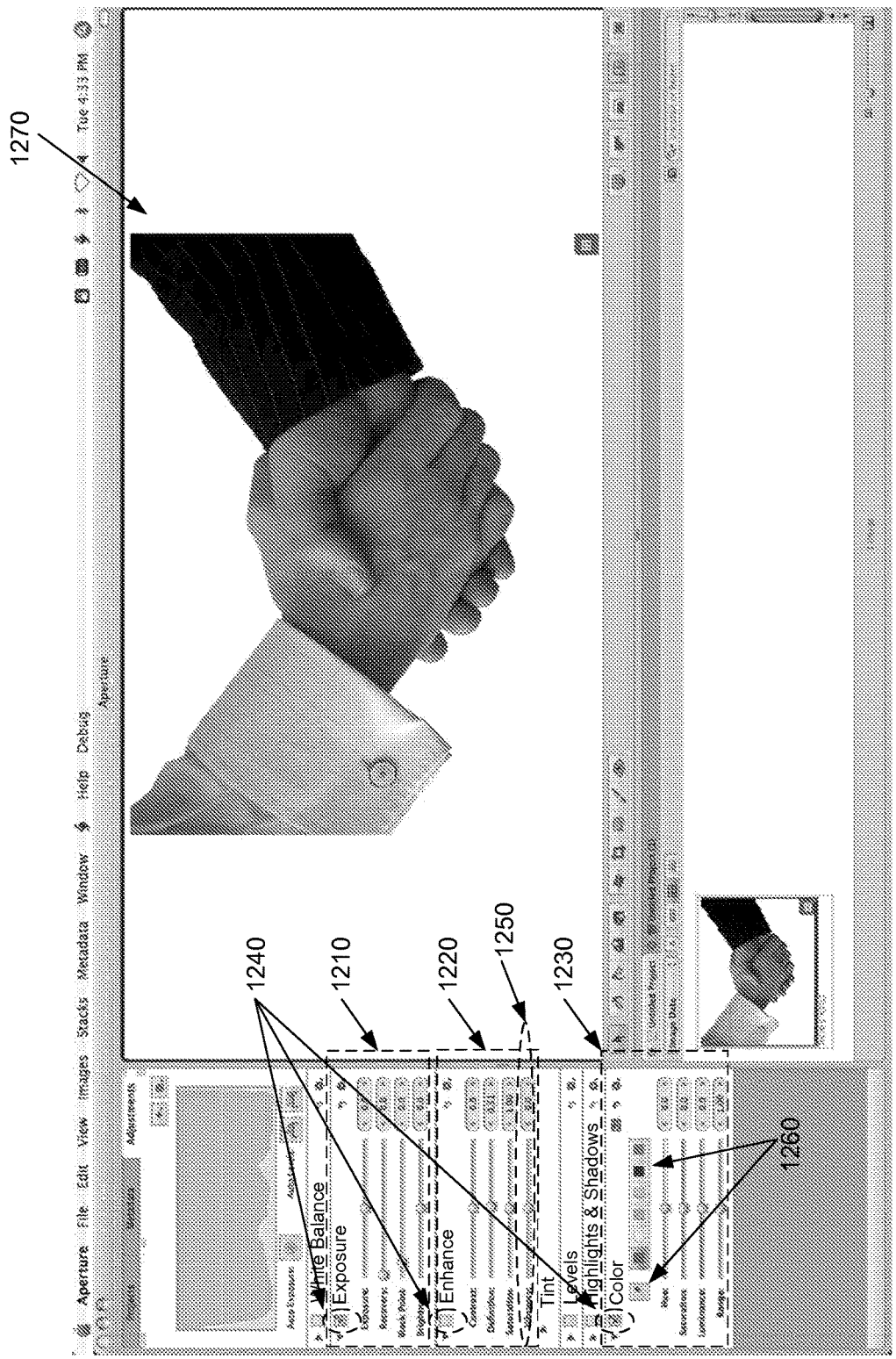
FIG. 12 illustrates the image-editing application of FIG. 11 with some of the collapsible functions expanded to show the various sub-functions and parameters for each such function.

FIG. 12 illustrates the image-editing application 1100 of FIG. 11 with the collapsible function menus 1210, 1220, and 1230 expanded to show the various functions and parameters for each function menu. The function menu 1210 includes four functions, each function for adjusting a particular exposure setting of the image (e.g., exposure, recovery, black point, and brightness). The function menu 1220 includes four functions that enhance the image by adjusting the contrast, definition, saturation, and vibrancy of the image; and the function menu 1230 includes four functions that adjust color settings (e.g., hue, saturation, luminance, and range) of the image. The function 1230 also includes additional image editing tools 1260 to select particular colors and provide other functionality.

Adjacent to each of the functions within the function menus are parameters that determine the amount or degree of impact produced by the function. A user may increase or decrease the impact of a given function by altering the specified parameter. As illustrated, each function includes a user interface slider item to adjust the parameter. The user interface slider item represents a range of values where different points along the sliding scale represent different values, each value adjusting the impact of the effect. Adjacent to the user interface slider item is a user interface text item for direct entry of a numerical value. The user interface text item accepts values within the range of values represented by the user interface slider item. Values greater than or less than the acceptable range of values will either be automatically scaled to the next closest acceptable value or will create a prompt to notify the user of the invalid entry. The user interface item is also adjustable using the increasing and decreasing arrows surrounding the numerical value.

It should be apparent to one of ordinary skill in the art that various other image editing functions can further be defined and incorporated within the image-editing application under the illustrated function menus 1210, 1220, and 1230 or within newly defined function menus. Additionally, in some embodiments, the depicted functions may include additional selectable parameters or alternative means for adjusting the same parameter.

The effects of a function on an image can be activated or deactivated at any time using the user interface items 1240. For instance, in FIG. 12 functions within the function menus 1210 and 1230 are active as illustrated with the checked boxes 1240 and the functions within the function menu 1220 are inactive as illustrated with the unchecked box 1240. When a function is active, the function is applied to the image and the result is displayed within the display window 1270. In some embodiments, the result of an active function is rendered in real-time within the display window 1270 and any subsequent modification to a function or a parameter of a function is similarly rendered in real-time within the display window 1270. In some embodiments, producing the real-time rendering is dependent on the available computing resources of the computer system on which the image-editing application runs. Nevertheless, real-time rendering causes the function to be applied to the image at the time the function is made active or any parameter of a function is altered. Thus, sliding the contrast function slider across the range of acceptable values causes the display window to update the contrast values of the image within the display window as the slider moves.

Figure 13:
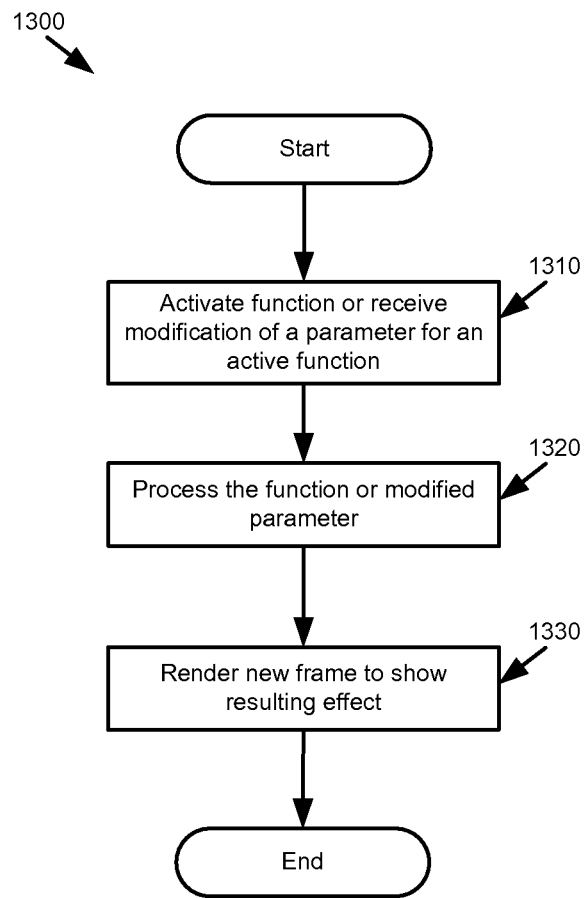
FIG. 13 presents a process for applying a function to an image.

FIG. 13 presents a process 1300 for applying a function to an image. In some embodiments, the process 1300 occurs in real-time in response to any function parameter change of an already active function or activation of a previously inactive function. The process 1300 assumes that an image has been loaded or imported into the image-editing application. Users can import images into the image-editing application from a computer readable medium that may include other computing devices, storage devices, or a solid stage storage of a digital camera as some examples. Users can also load previously imported images into the image-editing application from an image library of the image-editing application or an image library that is shared by multiple applications of the computer system.

The process 1300 begins when a function is activated (at 1310) or when parameters of an already active function are modified. When such a change is detected, the image-editing application processes (at 1320) the function or modified parameter to render (at 1330) a new frame of the image with the adjustments applied within the display window of the image-editing application. The resulting image displays the received image as changed by the specified function(s). In some embodiments, the process 1300 runs for the activation or deactivation of any function and for the modification of a parameter of any function.

In some embodiments, the image undergoing editing is retained within a cache or memory buffer until the effects of the function are permanently applied through a save command or the exit command. Additionally, in some embodiments, the resulting image displayed after applying the function is a new image frame separate from the received frame. In this manner, the effects of the function can be undone by reverting back to the received frame. Accordingly, some embodiments generate new frames for each function modification so that several changes can be undone without having to recompute each such change. In other embodiments the adjustments are made directly to a frame buffer and undoing each change requires rerendering the image.

In applying the functions, some embodiments generate and store a redundant copy of an original unmodified image (i.e., no applied effects) and apply the activated or modified function to the redundant copy. In some embodiments, this is referred to as nondestructive image processing in which the original image is never modified. Rather, the redundant copy that is created and stored alongside the original unmodified image is loaded into the image-editing application. The image-editing application renders all effects to the redundant copy. Therefore, if a user specifies removing a function or modifying a function at any time, the image-editing application may simply discard the redundant copy and create another duplicate from the original unmodified image on which to reapply the one or more functions. Nondestructive image processing is a feature of many image-editing applications such as Apple Aperture®.

Figure 14:
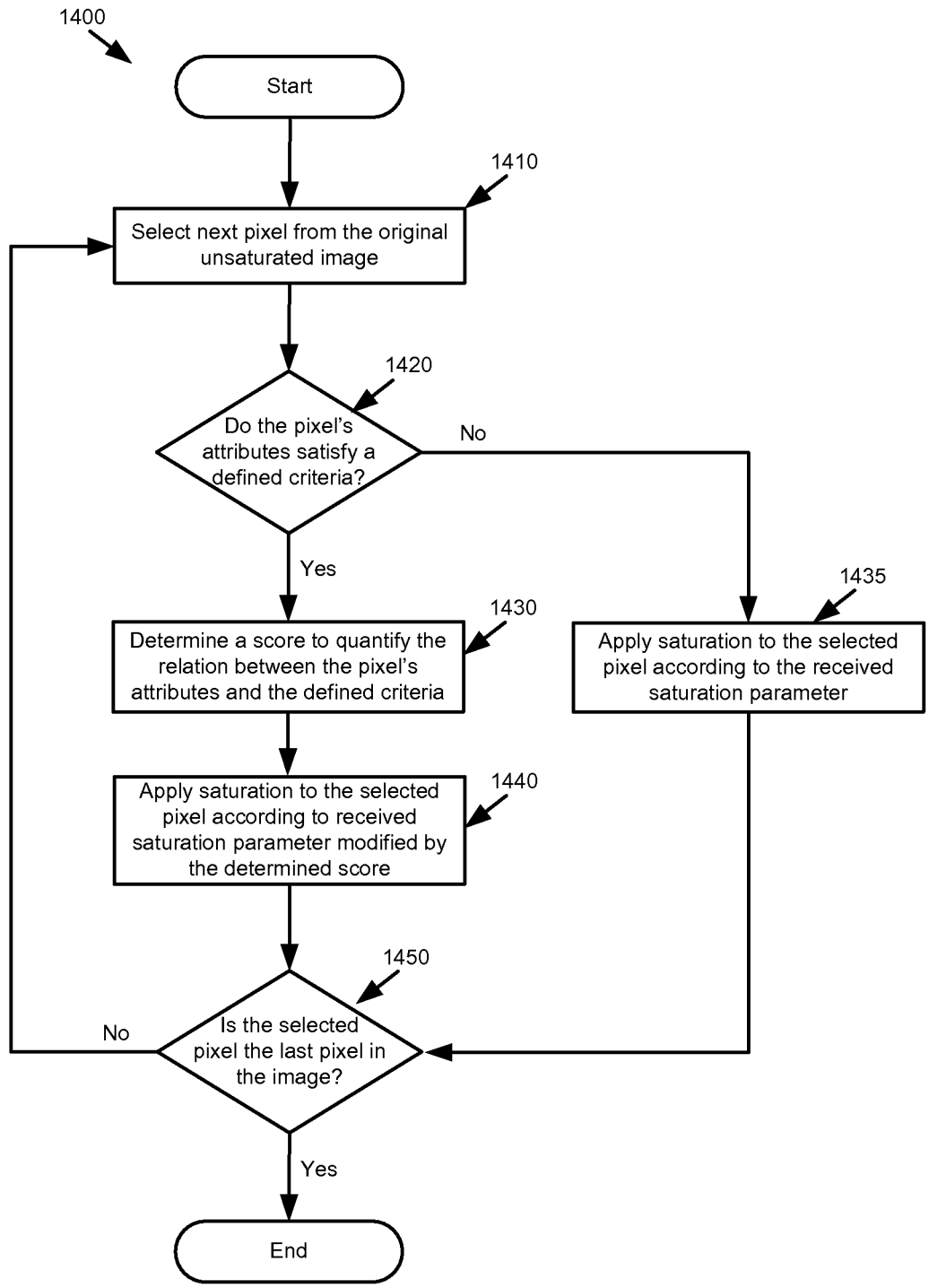
FIG. 14 presents a process for implementing the vibrancy function of some embodiments by performing a pixel by pixel analysis of an image in order to preserve saturation levels for skin toned pixels and saturate non-skin toned pixels.

FIG. 14 presents a process 1400 for implementing the vibrancy function of some embodiments by performing a pixel by pixel analysis of an image in order to preserve saturation levels for skin toned pixels and saturate non-skin toned pixels. This process 1400 is run whenever a user activates (i.e., selects) the vibrancy function or whenever the user modifies a parameter of an already active vibrancy function within an image-editing application.

The process 1400 begins by selecting (at 1410) a first pixel from an original image where the saturation levels of the original image are unmodified. The original image may be stored within a computer readable memory such as random access memory (RAM), a magnetic storage device, or memory of a graphics processing unit (GPU) of a computer system executing the vibrancy function. By retaining the unmodified saturation levels of the original image, some embodiments retain a reference point from which readjustments or multiple adjustments to the saturation levels can be made without lose of data with each progressive change. Each change is applied to the original image and thus each value of the vibrancy function parameter will produce the same result.

The process analyzes (at 1420) the selected pixel to determine whether the attributes of the selected pixel meet certain criteria. If the selected pixel's attributes satisfy the defined criteria, then the process determines (at 1430) a score for how closely the pixel's attributes relate to the defined criteria. In this example, the pixel's attributes satisfy the criteria when the attributes resemble those of a skin tone. The more the pixel's attributes resemble a skin tone, the higher the determined score. Various attributes of the pixel account for whether the pixel resembles a skin tone. Some such factors include the brightness, hue, RGB color, luminance and chrominance (YUV), YCbCr, and/or current saturation levels of the pixel. A more detailed explanation of the pixel analysis and determination of the score is provided below with reference to FIG. 15.

The process then modifies the saturation levels of the pixel by applying (at 1440) a modified amount of saturation defined by the vibrancy function based on the determined score at 1430. Therefore, if the criteria represent the likeness of the pixel's attributes to a skin tone, the amount of saturation to be applied to the pixel is modified by an amount representative of how close the pixel's attributes resemble those of the skin tone criteria. In this manner, some embodiments avoid the over saturation and/or under saturation of skin tones within the image. If the selected pixel's attributes do not satisfy (at 1420) the defined criteria, then the process directly applies (at 1435) the specified amount of saturation defined by the vibrancy function to the pixel.

After modifying the saturation level of the selected pixel, the process selects (at 1440) a next pixel of the original unsaturated image to process. The process ends (at 1450) after all pixels from the original unsaturated image have undergone the saturation process of FIG. 14. It should be apparent to one of ordinary skill in the art that in some embodiments the process 1400 executes over only a selected subset of pixels of an image or over blocks of pixels where a block of pixels includes two or more neighboring pixels.

Figure 15:
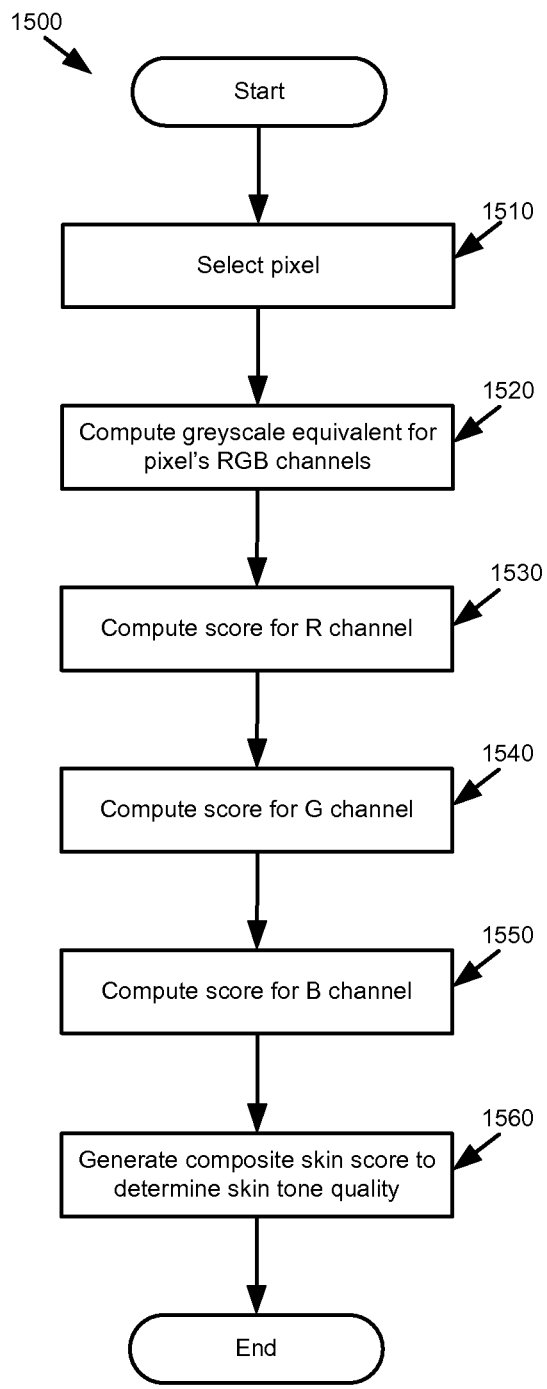
FIG. 15 presents a process for computing the score to quantify a pixel's likeness to a defined criteria.

FIG. 15 presents a process 1500 for computing the score to quantify a pixel's likeness to a defined criteria. Specifically, the process 1500 computes the score with reference to the pixel's likeness to a skin tone. The process 1500 begins by selecting (at 1510) a pixel to compare against the defined criteria. The process computes (at 1520) a grayscale equivalent of the selected pixel by averaging each of the red, green, blue (RGB) channels of the selected pixel.

The process then computes individual saturation scores for each channel by extrapolating the color of the particular channel away from gray to determine what percentage of the channel exceeds a [0.0 . . . 1.0] range. Thus, a pixel having RGB values of (0.5, 0.6, 0.7) will have a computed grayscale equivalent of (0.6, 0.6, 0.6).

The process determines (at 1530) the saturation score for the R channel to be 0.1666 as the R channel is 16.6% of the way from 0.6 to 0.0. Similarly, the process determines (at 1540) the saturation score for the G channel to be 0 as the G channel is 0% of the way from 0.6 to 0.0 and determines (at 1550) the saturation score for the B channel to be 0.25 as the B channel is 25% of the way from 0.6 to 1.0. In other embodiments, the process 1500 computes additional scores for other pixel attributes in addition to or in place of the above enumerated attributes. For instance, a similar technique can be used to compute score for component of the YUV color model.

The process generates (at 1560) a composite score based on each of the individual scores. The composite score reflects the likeness of the pixel's attributes to the defined criteria (i.e., skin tone). Using the skin tone example above, a pixel is considered to be a skin tone when the R channel is greater than the G channel which is greater than the B channel and there exists some level of saturation within the RGB color. This relationship indicates that the hue of the pixel is between red and yellow. In this manner, flat gray and vivid oranges are not considered as skin tones, whereas a faded orange color will be considered as a skin tone.

A greater composite score signifies a better match to the defined set of criteria. Some embodiments derive the defined criteria by specifying a range of pixel attributes. For instance, some embodiments specify a skin tone as being within a particular RGB range. Other embodiments define a skin tone as being within a particular YUV color model range or YCbCr color model range. A pixel's attributes falling within the middle of the range indicates the pixel is very likely to be a skin tone and thus should not be saturated or saturated by a minimal amount. A pixel's attributes falling within the outer limits of the range indicate the pixel is somewhat likely to be a skin tone and thus should be saturated more than a pixel whose attributes fall within the middle of the defined ranges.

In some embodiments, the composite score is normalized within a specified range, such as a range from the value [0.0 . . . 1.0], where a value of 0.0 indicates not a skin tone and a value of 1.0 indicates a skin tone. The scaled score indicates the quality of the skin tone and is the value used for reducing the level of saturation to apply to the identified skin tones throughout the image. The processes 1400 and 1500 apply when increasing and/or decreasing the saturation levels of an image. It should be apparent to one of ordinary skill in the art that even though the process 1500 has been described as a pixel by pixel process, some embodiments implement the process 1500 by analyzing and modifying blocks of pixels at each iteration.

In some embodiments, the image-editing application has several additional functionalities in addition to those described above. For instance, in some embodiments, the image-editing application provides a set of tools for (1) organizing images into different collections of images (e.g., different digital photo albums), (2) organizing the images by tagging images with informative keywords, (3) organizing the images by marking selected images as favorites, or (4) organizing the images by rating each image. The image-editing application can also publish images into a "photo book" of images, publish the images on the World Wide Web, or publish the images as individual image prints.

Each photo book has several pages that have one or more picture fields for presenting pictures. Different photo books can differ in their size, themes, covers, page designs, page colors, picture-field designs, picture-field layouts, and/or other attributes. In some embodiments, a user can modify the page design, color, frame design, and/or other thematic aspects of a selected photo books. Also, in some embodiments, the user can add picture and text fields to the photo book. Examples of image-editing applications with such additional functionality include Apple iPhoto® and Apple Aperture®.

IV. Computer System

Figure 16:
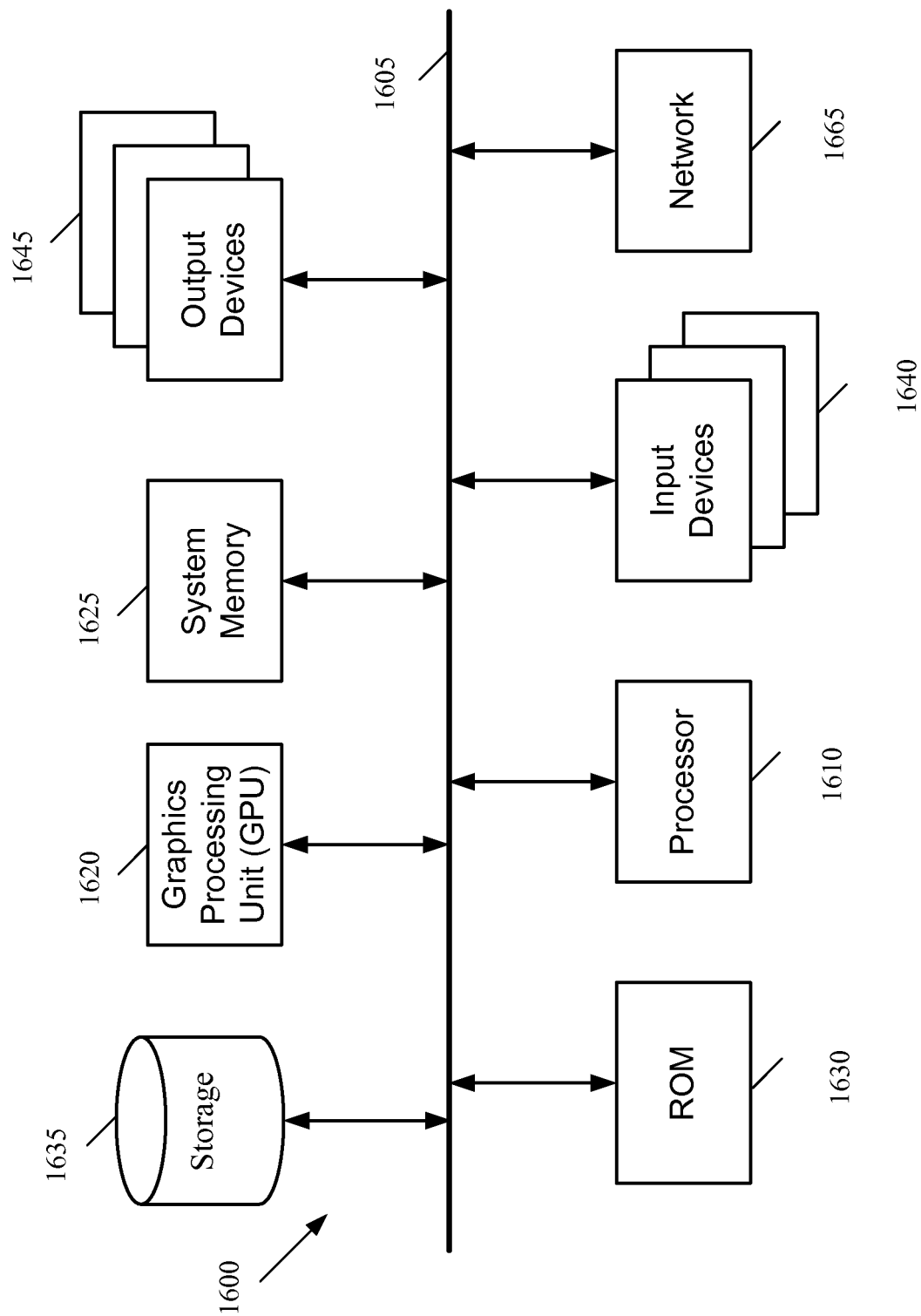
FIG. 16 illustrates a computer system with which some embodiments of the invention are implemented.

FIG. 16 illustrates a computer system with which some embodiments of the invention are implemented. Computer system 1600 includes a bus 1605, a processor 1610, a graphics processing unit (GPU) 1620, a system memory 1625, a read-only memory 1630, a permanent storage device 1635, input devices 1640, and output devices 1645.

The bus 1605 collectively represents all system, peripheral, and chipset buses that communicatively connect the numerous internal devices of the computer system 1600. For instance, the bus 1605 communicatively connects the processor 1610 with the read-only memory 1630, the GPU 1620, the system memory 1625, and the permanent storage device 1635.

From these various memory units, the processor 1610 retrieves instructions to execute and data to process in order to execute the processes of the invention. Some instructions are passed to and executed by the GPU 1620. The GPU 1620 can offload various computations or complement the image processing provided by the processor 1610. Such functionality can be provided using CoreImage's kernel shading language.

The read-only-memory (ROM) 1630 stores static data and instructions that are needed by the processor 1610 and other modules of the computer system. The permanent storage device 1635, on the other hand, is a read-and-write memory device. This device is a non-volatile memory unit that stores instructions and data even when the computer system 1600 is off. Some embodiments of the invention use a mass-storage device (such as a magnetic or optical disk and its corresponding disk drive) as the permanent storage device 1635.

Other embodiments use a removable storage device (such as a floppy disk or ZIP® disk, and its corresponding disk drive) as the permanent storage device. Like the permanent storage device 1635, the system memory 1625 is a read-and-write memory device. However, unlike storage device 1635, the system memory is a volatile read-and-write memory, such a random access memory. The system memory stores some of the instructions and data that the processor needs at runtime. In some embodiments, the invention's processes are stored in the system memory 1625, the permanent storage device 1635, and/or the read-only memory 1630.

The bus 1605 also connects to the input and output devices 1640 and 1645. The input devices enable the user to communicate information and select commands to the computer system. The input devices 1640 include alphanumeric keyboards and pointing devices. The output devices 1645 display images generated by the computer system. For instance, these devices display a graphical user interface. The output devices include printers and display devices, such as cathode ray tubes (CRT) or liquid crystal displays (LCD).

Finally, as shown in FIG. 16, bus 1605 also couples computer 1600 to a network 1665 through a network adapter (not shown). In this manner, the computer can be a part of a network of computers (such as a local area network ("LAN"), a wide area network ("WAN"), or an Intranet, or a network of networks, such as the internet. For example, the computer 1600 may be coupled to a web server (network 1665) so that a web browser executing on the computer 1600 can interact with the web server as a user interacts with a graphical user interface that operates in the web browser.

Any or all components of computer system 1600 may be used in conjunction with the invention. For instance, in some embodiments the execution of the vibrancy function is performed by the GPU 1620 instead of the CPU 1610. Similarly, other image editing functions can be offloaded to the GPU 1620 where they are executed before the results are passed back into memory or the processor 1610. However, a common limitation of the GPU 1620 is the number of instructions that the GPU 1620 is able to store and process at any given time. Therefore, some embodiments adapt the instructions for implementing the processes 1400 of FIG. 14 and 1500 of FIG. 15 so that these processes fit onto the instruction buffer of the GPU 1620 for execution locally on the GPU 1620. Additionally, some GPU do not contain sufficient processing resources to execute the processes of some embodiments and therefore the processor executes the instructions. One of ordinary skill in the art would appreciate that any other system configuration may also be used in conjunction with the present invention.

While the invention has been described with reference to numerous specific details, one of ordinary skill in the art will recognize that the invention can be embodied in other specific forms without departing from the spirit of the invention. For instance, Apple Mac OS® environment and Apple Aperture® tools are used to create some of these examples, a person of ordinary skill in the art would realize that the invention may be practiced in other operating environments such as Microsoft Windows®, UNIX, Linux, etc., and other applications such as Adobe Photoshop®, Adobe Lightroom®, Apple iPhoto®, etc., without the use of these specific details. Also, some of the examples may be executed on a GPU or CPU of a computer system depending on the computing resources available on the computer system or alternatively on any electronic device that is able to view images. The examples have discussed application of the various image editing functions to images, but each of the above examples are extensible to apply to other forms of visual media such as video. Thus, one of ordinary skill in the art would understand that the invention is not to be limited by the foregoing illustrative details, but rather is to be defined by the appended claims.

I claim:

1. A method, comprising:
   displaying an image defined by a plurality of pixels, each pixel having a set of component color values that corresponds to a color sample in a color space;
   receiving a single adjustment input to a single adjustable user interface (UI) item; and
   in response to the single adjustment to the single adjustable UI item:
      for each pixel having a set of component color values that falls within a sub-region of the color space, determining a nearest matching color sample of a plurality of color samples in the sub-region having component color values nearest to the component color values of the pixel, and adjusting to a particular degree of adjustment the pixel's set of component color values based at least in part on the single adjustment of the single adjustable UI item and a deviation of the pixel's set of component color values from the set of component color values of the nearest matching color sample in the sub-region, and
      for each pixel having a set of component color values that falls outside of the sub-region of the color space, adjusting to another degree of adjustment the pixel's set of component color values based at least in part on the single adjustment of the single adjustable UI item, wherein the other degree of adjustment is different than the particular degree of adjustment.

2. The method of claim 1, wherein adjusting to the particular degree of adjustment the pixel's set of component color values comprises adjusting the set of component color values of a particular pixel having a set of component color values that falls within the sub-region less than the set of component color values of another pixel having a set of component color values that falls within the sub-region.

3. The method of claim 1, wherein the sub-region of the color space represents a range of skin colors.

4. The method of claim 1, wherein each set of component color values comprises a brightness or luminance value, wherein, the deviation of the pixel's set of component color values is independent of the pixel's brightness or luminance value.

5. The method of claim 1, wherein each set of component color values comprises hue and saturation values, wherein the deviation is determined from a deviation of the pixel's hue and saturation values from the hue and saturation values of the nearest matching color sample in the sub-region.

6. The method of claim 1, wherein each set of component color values comprises red, green, and blue (RGB) color values, wherein the deviation is determined from the deviation of the pixel's RGB color values from the RGB color values of the nearest matching color sample in the sub-region.

7. The method of claim 1, wherein the particular degree of adjustment to a pixel's set of component color values that fall within the sub-region of the color space is non-uniform relative to at least some other pixels that also fall within the sub-region; and wherein the other degree of adjustment to each pixel's set of component color values that fall outside the sub-region of the color space is uniform.

8. A system comprising:
   a memory; and
   one or more processors coupled to the memory, wherein the memory comprises program instructions executable by the one or more processors to:
      display an image defined by a plurality of pixels, each pixel having a set of component color values that correspond to a color sample in a color space;
      provide a single adjustable user interface (UI) item; and
      in response to a single adjustment to the single adjustable UI item:
         for each pixel having a set of component color values that falls within a sub-region of the color space, determine a nearest matching color sample of a plurality of color samples in the sub-region having component color values nearest to the component color values of the pixel, and adjust to a particular degree of adjustment the pixel's set of component color values based at least in part on the single adjustment of the single adjustable UI item and a deviation of the pixel's set of component color values from the set of the component color values of the nearest matching color sample in the sub-region, and
         for each pixel having a set of component color values that falls outside of the sub-region of the color space, adjust to another degree of adjustment the pixel's set of component color values based at least in part on the single adjustment of the single adjustable UI item, wherein the other degree of adjustment is different than the particular degree of adjustment.

9. The system of claim 8, wherein the sub-region comprises a plurality of color samples that represent different matching skin color samples.

10. The system of claim 9, wherein the plurality of color samples comprises distinct and non-contiguous color samples.

11. The system of claim 8, wherein a greater adjustment is applied to pixels with component color values that deviate more from the nearest matching color sample than pixels that deviate less.

12. The system of claim 8, wherein adjustment to the particular degree of adjustment is applied to pixels with component color values deviating by a specified threshold from the nearest matching color sample.

13. The system of claim 8, wherein the particular degree of adjustment to a pixel's set of component color values that fall within the sub-region of the color space is non-uniform relative to at least some other pixels that also fall within the sub-region; and wherein the other degree of adjustment to the pixel's set of component color values that fall outside the sub-region of the color space is uniform.

14. A non-transitory computer readable storage medium storing a computer program that when executed by at least one processing unit provides a graphical user interface (GUI), the GUI comprising:

a display area for displaying an image defined by a plurality of pixels, each pixel having a set of component color values that corresponds to a color sample in a color space; and a single adjustable UI item;

wherein the computer program when executed by the at least one processing unit further:

in response to a single adjustment to the single adjustable UI item:

selects one or more particular color samples of a plurality of color samples in a sub-region of an image, and adjusts to a particular degree of adjustment a set of component color values of each of a particular set of pixels within the image based at least in part on the single adjustment of the single adjustable UI item and a deviation of each of the pixel's corresponding color sample from a nearest one of the particular color samples within the sub-region of the color space, and adjusts to another degree of adjustment a set of component color values of another set of pixels within the image based at least in part on the single adjustment of the single adjustable UI item.

15. The non-transitory computer readable storage medium of claim 14, wherein the single adjustable UI item selects an amount of saturation to apply to the pixels of the image.

16. The non-transitory computer readable storage medium of claim 14, wherein the sub-region of the color space represents skin tone color samples.

17. The non-transitory computer readable storage medium of claim 14, wherein the particular degree of adjustment to a pixel's set of component color values that fall within the sub-region of the color space is non-uniform relative to at least some other pixels that also fall within the sub-region; and wherein the other degree of adjustment to each pixel's set of component color values that fall outside the sub-region of the color space is uniform.

\* \* \* \* \*